United States Patent
Cody et al.

(10) Patent No.: US 7,460,520 B2
(45) Date of Patent: Dec. 2, 2008

(54) APPARATUS AND METHOD FOR USING MULTIPLE CALL CONTROLLERS OF VOICE-BAND CALLS

(75) Inventors: Timothy Cody, Raleigh, NC (US); Gregory Germain, Cary, NC (US)

(73) Assignee: Paradyne Corporation, Largo, FL (US)

( * ) Notice: Subject to any disclaimer, the term of this patent is extended or adjusted under 35 U.S.C. 154(b) by 1258 days.

(21) Appl. No.: 10/463,964

(22) Filed: Jun. 18, 2003

(65) Prior Publication Data

US 2004/0095925 A1 May 20, 2004

Related U.S. Application Data

(60) Provisional application No. 60/427,804, filed on Nov. 20, 2002.

(51) Int. Cl.
*H04L 12/66* (2006.01)
(52) U.S. Cl. ........................ 370/352; 370/356
(58) Field of Classification Search .......... 370/352, 370/356, 395.1, 524, 401
See application file for complete search history.

(56) References Cited

U.S. PATENT DOCUMENTS

| | | | |
|---|---|---|---|
| 2002/0176403 A1* | 11/2002 | Radian | 370/352 |
| 2003/0214971 A1* | 11/2003 | Sheldon et al. | 370/467 |
| 2004/0042444 A1* | 3/2004 | Edmon et al. | 370/352 |

\* cited by examiner

*Primary Examiner*—William J Deane
(74) *Attorney, Agent, or Firm*—Thomas, Kayden, Horstemeyer & Risley LLP

(57) ABSTRACT

An apparatus for using multiple call controllers of voice-band calls is provided. The apparatus includes a first protocol endpoint, a second protocol endpoint, and a protocol adapter. The first protocol endpoint is configured to receive at least one first external message from a first call controller and to map the first external message to at least one corresponding first internal call control message. The second protocol endpoint is configured to receive at least one second external message from an integrated access device and to map the at least one second external message to at least one corresponding second internal call control message. The protocol adapter is configured to receive the first and the second internal messages and to route the first and the second internal messages to the appropriate one of the first and second endpoints.

27 Claims, 19 Drawing Sheets

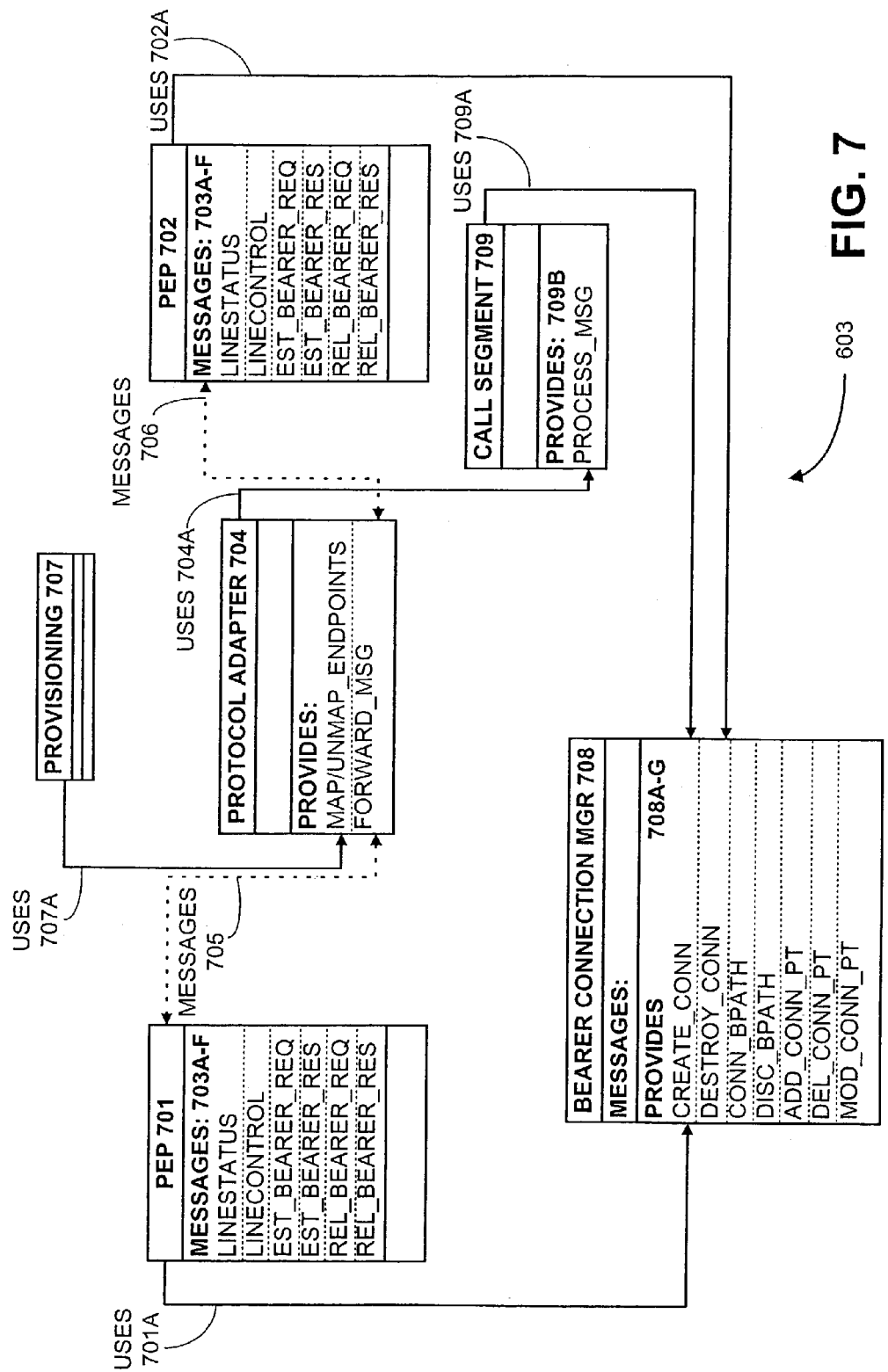

APPARATUS AND METHOD FOR USING MULTIPLE CALL CONTROLLERS OF VOICE-BAND CALLS

CROSS REFERENCE TO RELATED APPLICATIONS

This application claims the benefit of U.S. Provisional Application No. 60/427,804, filed Nov. 20, 2002, which is entirely incorporated herein by reference.

FIELD OF THE INVENTION

The present invention is generally related to telecommunications and, more particularly, to a system and method for supporting multiple central controllers of voice-band calls.

BACKGROUND

In the past, circuit-switched networks were used to carry voice traffic from one subscriber to another, while separate packet-switched networks were used to carry data traffic. Two networks were used because the existing protocols and technology available for packet networks did not provide certain characteristics necessary for voice-band calls, such as low latency and deterministic quality of service. Improvements in packet network protocols and technology which address these deficiencies allow a new kind of packet network, sometimes called a "converged network," to carry both voice and data traffic.

The equipment that interfaces a converged packet network with a circuit-switched network is referred to as a "voice gateway," a "media gateway", or a "voice-over-packet gateway." The voice gateway interfaces with one or more call controllers on its trunk side, and with one or more integrated access devices (IADs) on its subscriber side. The IAD provides a link to the packet network and to the voice gateway for multiple subscribers. The call controller directs the voice gateway to make voice connections. In a circuit-switched network, call control is performed by a telephony switch, for example a Class 5 or a Class 4 switch. In a convergence packet-network, call control is performed by a "softswitch." Several different call control protocols are in use by different switches.

Migrating from the circuit-switched network to the converged network is an evolutionary process, so that for some period of time many customers will be reachable only through a circuit-switched network. Yet all customers expect the ability to call from one telephone to any other telephone, regardless of what type of network the originating and terminating telephones are located on. Therefore, converged networks will need to interface with circuit-switched networks as well as other converged networks. Thus a need exists for a voice gateway which can support multiple call control protocols and interface with different types of telephony switches and different types of softswitches, simultaneously.

SUMMARY

The present invention provides an apparatus and method for using multiple call controllers of voice-band calls. Briefly described, in architecture, one embodiment of the apparatus, among others, comprises: a first protocol endpoint configured to receive at least one first external message from a first call controller and to map the first external message to at least one corresponding first internal call control message; a second protocol endpoint configured to receive at least one second external message from an integrated access device (IAD) and to map the at least second one external message to at least one corresponding second internal call control message; and a protocol adapter configured to receive the first and the second internal message and to route the first and the second internal message to an appropriate one of the first and second endpoints.

The present invention can also be viewed as providing methods for supporting multiple call control protocols. In this regard, one embodiment of such a method, among others, can be broadly summarized by the following steps: receiving at least one first external message from a first call controller; mapping the first external message to at least one corresponding first internal call control message; receiving at least one second external message from an integrated access device (IAD); mapping the at least second one external message to at least one corresponding second internal call control message; and routing the first and the second internal message to an appropriate one of the first and second endpoints.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

DESCRIPTION OF THE DRAWINGS

FIGS. 13A & 13B are a sequence diagram of object interactions for an outgoing call from a Class 5 switch using the GR-303 protocol. The diagram illustrates the interactions between objects in one embodiment of the call control module.

DETAILED DESCRIPTION

In general, the present invention relates to a system and method for simultaneously interfacing with different types of call controllers in a voice gateway 101. The call controllers may use different call control protocols. The voice gateway 101 adapts each of these different call control protocols to a common representation so that all can be interfaced simultaneously.

FIGS. 1-4 illustrate various embodiments of the voice gateway 101 interfacing with different call controllers to place and receive voice-band calls. For ease of illustration, FIGS. 1-4 each show one call scenario, with the endpoint telephony devices and/or the type of call controller varying from one figure to another. However, the voice gateway 101 is capable of handling all of these call scenarios simultaneously.

Figure 1:
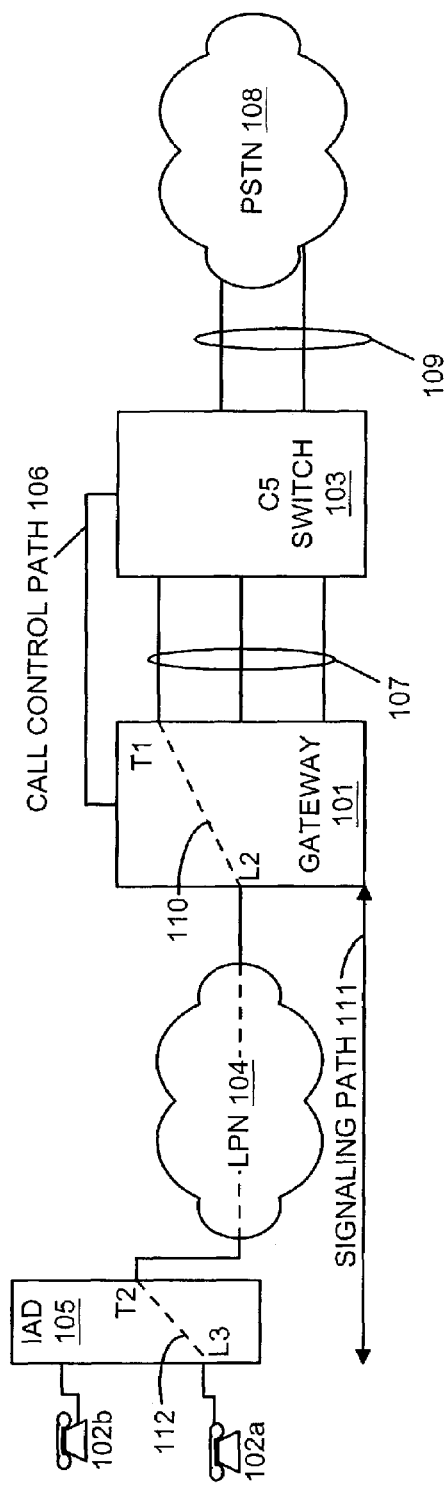
FIG. 1 is a block diagram of a call processing scenario with a call between a telephony device and another telephony device on the Public Switched Telephone Network (PSTN), using a Class 5 switch as the call controller.

FIG. 1 is a block diagram illustrating voice gateway 101 handling a voice-band call between a telephony device 102a and another telephony device (not shown) on the Public Switched Telephone Network (PSTN) 108, using Class 5 switch 103 as the call controller. Telephony device 102a communicates with voice gateway 101 over Local Packet Network (LPN) 104, with Integrated Access Device (IAD) 105 converting analog voice signals to voice packets, and vice-versa.

Class 5 (C5) switch 103 uses a master/slave model for call control: Class 5 switch 103 is the master; the voice gateway 101 is the slave which controls telephony device 102a under the direction of the master. In this example, General Requirements 303 (GR-303) is used as the call control protocol, though other Class 5 protocols such as European Telecommunications Standards Institute V.5 (V.5) or Integrated Services Digital Network (ISDN) could be used.

Class 5 switch 103 exchanges GR-303 protocol messages with voice gateway 101 over call control path 106. The GR-303 protocol logically separates call control from voice traffic, but both use the same physical interface. Therefore, voice-band traffic also travels between Class 5 switch 103 and voice gateway 101, over GR-303 trunks 107. From Class 5 switch 103, the voice traffic goes to the PSTN 108 over intermachine (IMT) trunks 109.

Class 5 switch 103 uses GR-303 call control messages to direct the voice gateway 101 to set up a call, to connect the originating and terminating sides, and to tear down the call. In this example, Class 5 switch 103 sends a GR-303 call control message directing the voice gateway 101 to connect trunk 1 to line 2. Voice gateway 101 acts on the message, as is shown by voice path 110 connecting trunk 1 and line 2.

Voice gateway 101 also converts the GR-303 call control messages into signaling messages which are communicated to IAD 105 over logical signaling path 111. IAD 105 acts on the signaling messages by setting up the voice path 112 connecting trunk 2 and line 3. IAD 105 also communicates the signaling to and from telephony device 102a, such as ringing, on-hook, off-hook, etc.

This example shows a voice-band path established between telephony device 102a and Class 5 switch 103. Once this voice-band path is established, Class 5 switch 103 performs its "Class 5" functions: providing dialtone, collecting digits, and routing the voice-band path through the PSTN 108 to another Class 5 switch 103.

The other telephony device involved in the voice-band call could be anywhere on the PSTN 108. In this configuration, a voice-band call between telephony device 102a and telephony device 102b, both attached to IAD 105, would still require the voice-band path to go through the Class 5 switch 103.

Figure 2:
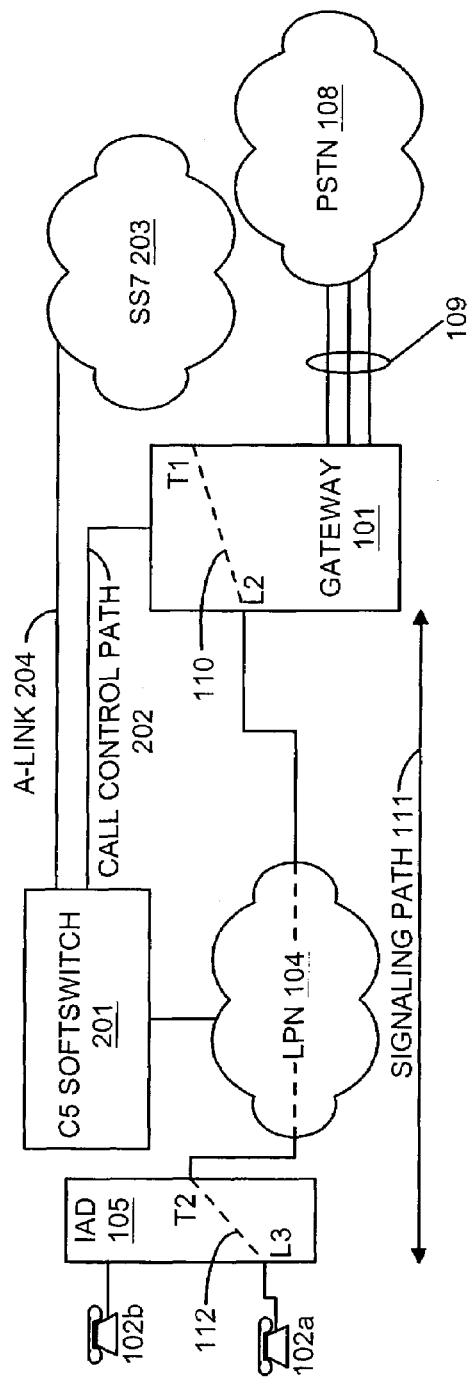
FIG. 2 is a block diagram of another call processing scenario with a call between a telephony device and another telephony device on the PSTN, using a Class 5 softswitch as the call controller.

FIG. 2 is a block diagram illustrating voice gateway 101 handling a voice-band call between a telephony device 102a and another telephony device (not shown) on the PSTN 108, using Class 5 softswitch 201 as the call controller. As in FIG. 1, telephony device 102a communicates with voice gateway 101 over LPN 104, with IAD 105 converting analog voice signals to voice packets, and vice-versa.

Like Class 5 switch 103, Class 5 softswitch 201 also uses a master/slave model for call control, with slave voice gateway 101 controlling telephony device 102a under the direction of master Class 5 softswitch 201. However, Class 5 softswitch 201 uses a different type of call control protocol than a classic telephony switch. In this example, Media Gateway Control Protocol (MGCP) is used as the call control protocol, although another softswitch protocol such as H.248 or Session Initiation Protocol (SIP) could be used.

Class 5 softswitch 201 exchanges MGCP protocol messages with voice gateway 101 through LPN 104 over logical call control path 202. (There is usually no direct physical link between Class 5 softswitch 201 and voice gateway 101. Instead, both have a physical link to LPN 104.) A softswitch, unlike a classic telephony switch, allows separation of call control messages and voice traffic at the physical level. Voice traffic between voice gateway 101 and PSTN 108 travels over IMT trunks 109.

Class 5 softswitch 201 uses MGCP call control messages to direct the voice gateway 101 to set up the call, to connect the originating and terminating sides, and to tear down the call. In addition to acting as call controller, Class 5 softswitch 201 also performs "Class 5" functions by directing voice gateway 101 to play dialtone, collect digits, etc. Softswitch protocols such as MGCP and H.248 therefore support a rich set of status and control messages between the switch and the gateway. In contrast, a classic call control protocol such as GR-303 needs only a limited set (off-hook, on-hook, ring, etc.) since the Class 5 switch 103 (not the voice gateway 101) plays dialtone, collects digits, etc., over the voice-band path that was connected by the voice gateway 101.

Class 5 softswitch 201 acts as a local switch and therefore needs to exchange signaling messages with the remote Class 5 switch. However, IMT trunks 109 carry only voice. Class 5 softswitch 201 uses the Signaling System 7 (SS7) network 203 for signaling, so Class 5 softswitch 201 has a A-link connection 204 to the SS7 network 203.

In this example call setup, Class 5 softswitch 201 sends a call control message directing voice gateway 101 to connect trunk 1 to line 2. Voice gateway 101 acts on the message to set up voice voice path 110 connecting trunk 1 and line 2. Voice gateway 101 may perform packet conversion if the two sides of the call use different protocols. (Packet conversion will be discussed in more detail below.)

Voice gateway 101 also converts the MGCP call control messages into signaling messages which are communicated to IAD 105 over logical signaling path 111. IAD 105 acts on the signaling messages, as is shown by voice path 112 connecting trunk 2 and line 3. IAD 105 also communicates the signaling to telephony device 102a, such as ringing, on-hook, off-hook, etc.

Figure 3:
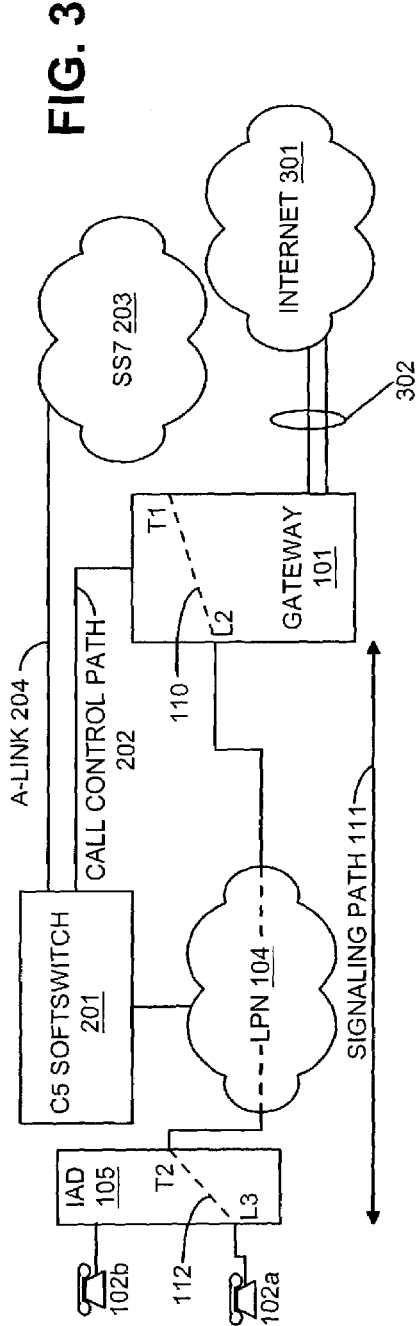
FIG. 3 is a block diagram of yet another call processing scenario with a call between a telephony device and another telephony device on the Internet, using a Class 5 softswitch as the call controller.

FIG. 3 is a block diagram illustrating voice gateway 105 handling a voice-band call between a telephony device 102a and another telephony device (not shown) on the Internet 301, using Class 5 softswitch 201 as the call controller. Telephony device 102a communicates with voice gateway 101 over LPN 104, with IAD 105 converting analog voice signals to voice packets, and vice-versa.

As in FIG. 2, Class 5 softswitch 201 exchanges MGCP protocol messages with voice gateway 101 through LPN 104 over logical call control path 202. Voice traffic in FIG. 3 between voice gateway 101 and Internet 301 travels over link 302, which uses Internet Protocol (IP) as its transport protocol.

Class 5 softswitch 201 uses MGCP call control messages to direct the voice gateway 101 to set up the call, to connect the originating and terminating sides, and to tear down the call. In addition to acting as call controller, Class 5 softswitch 201 also performs Class 5 functions by directing voice gateway 101 to play dialtone, collect digits, etc. Class 5 softswitch 201 uses A-link connection 204 to SS7 network 203 to exchange signaling messages with the remote Class 5 switch.

In this example call setup, Class 5 softswitch 201 sends a call control message directing voice gateway 101 to connect trunk 1 to line 2. Voice gateway 101 acts on the message to set up voice voice path 110 connecting trunk 1 and line 2. Voice gateway 101 may perform packet conversion if the two sides of the call use different protocols.

Voice gateway 101 also converts the MGCP call control messages into signaling messages which are communicated to IAD 105 over logical signaling path 111. IAD 105 acts on the signaling messages, as is shown by voice path 112 connecting trunk 2 and line 3. IAD 105 also communicates the signaling to telephony device 102a, such as ringing, on-hook, off-hook, etc.

Figure 4:
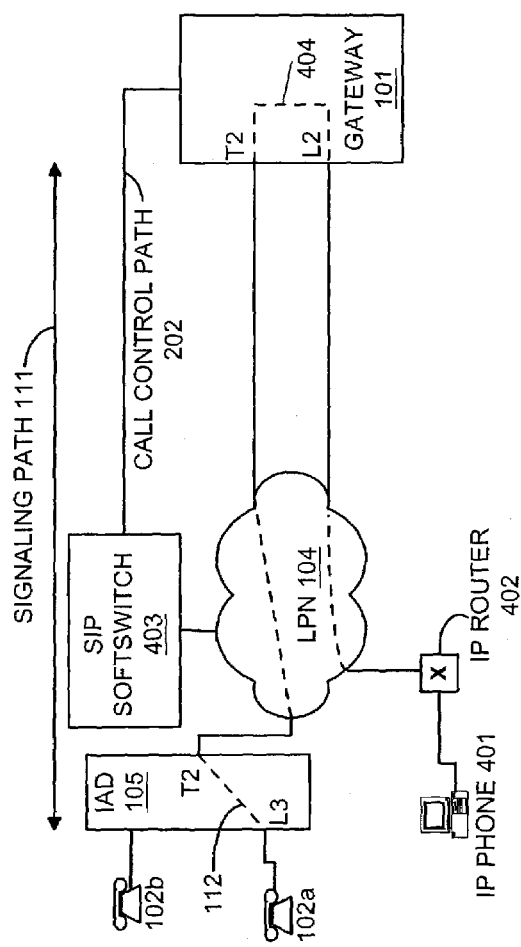
FIG. 4 is a block diagram of another call processing scenario with a call between an Internet Protocol (IP) telephony device and another telephony device, using a Class 5 softswitch as the call controller.

FIG. 4 is a block diagram illustrating voice gateway 101 handling a voice-band call between IP phone 401 and telephony device 102a, using a Class 5 softswitch as the call controller, and Session Initiation Protocol (SIP) as the call control protocol. The call control model used by SIP is client-server rather than master-slave. Instead of a master call controller directing a slave to control devices, in the SIP model client devices such as IP phone 401 communicate with other client devices. Though SIP clients can communicate directly with each other to set up voice-band calls, it is more common for them to communicate through a server which acts as an intermediary. However, once the voice-band call is set up, the voice traffic travels between SIP clients without involving the server.

IP phone 401 is a SIP client, connected to LPN 104 through IP switch/router 402. SIP softswitch 403 is a SIP server. However, telephony device 102a does not support SIP, so voice gateway 101 acts as a SIP client on behalf of telephony device 102a. Neither SIP softswitch 403 nor IP phone 401 is aware of the existence of telephony device 102a.

Acting on requests from SIP client IP phone 401, SIP softswitch 403 exchanges SIP call control messages with voice gateway 101 over logical call control path 202. SIP softswitch 403 directs the voice gateway 101 to set up a call, to connect the originating and terminating sides, and to tear down the call. In this example, SIP softswitch 403 sends a call control message directing voice gateway 101, acting as SIP client, to establish an Voice-over-IP (VoIP) connection with IP phone 401. Voice gateway 101 acts on the message, as is shown by voice path 404 connecting trunk 2 and line 2. As in FIGS. 2 and 3, the call control messages and the voice traffic are physically separate, so that voice traffic does not travel through SIP softswitch 403.

Because telephony device 102a doesn't support SIP or VoIP, the VoIP connection terminates with voice gateway 101, Therefore, when voice gateway 101 establishes a VoIP connection with IP phone 401 in response to the request from SIP softswitch 403, voice gateway 101 also establishes a voice path to telephony device 102a via IAD 105. This involves sending signaling messages to IAD 105. IAD 105 acts on the signaling messages, as is shown by voice path 112 connecting trunk 2 and line 3, and also communicates signaling to telephony device 102a, such as ringing, on-hook, off-hook, etc.

Figure 5:
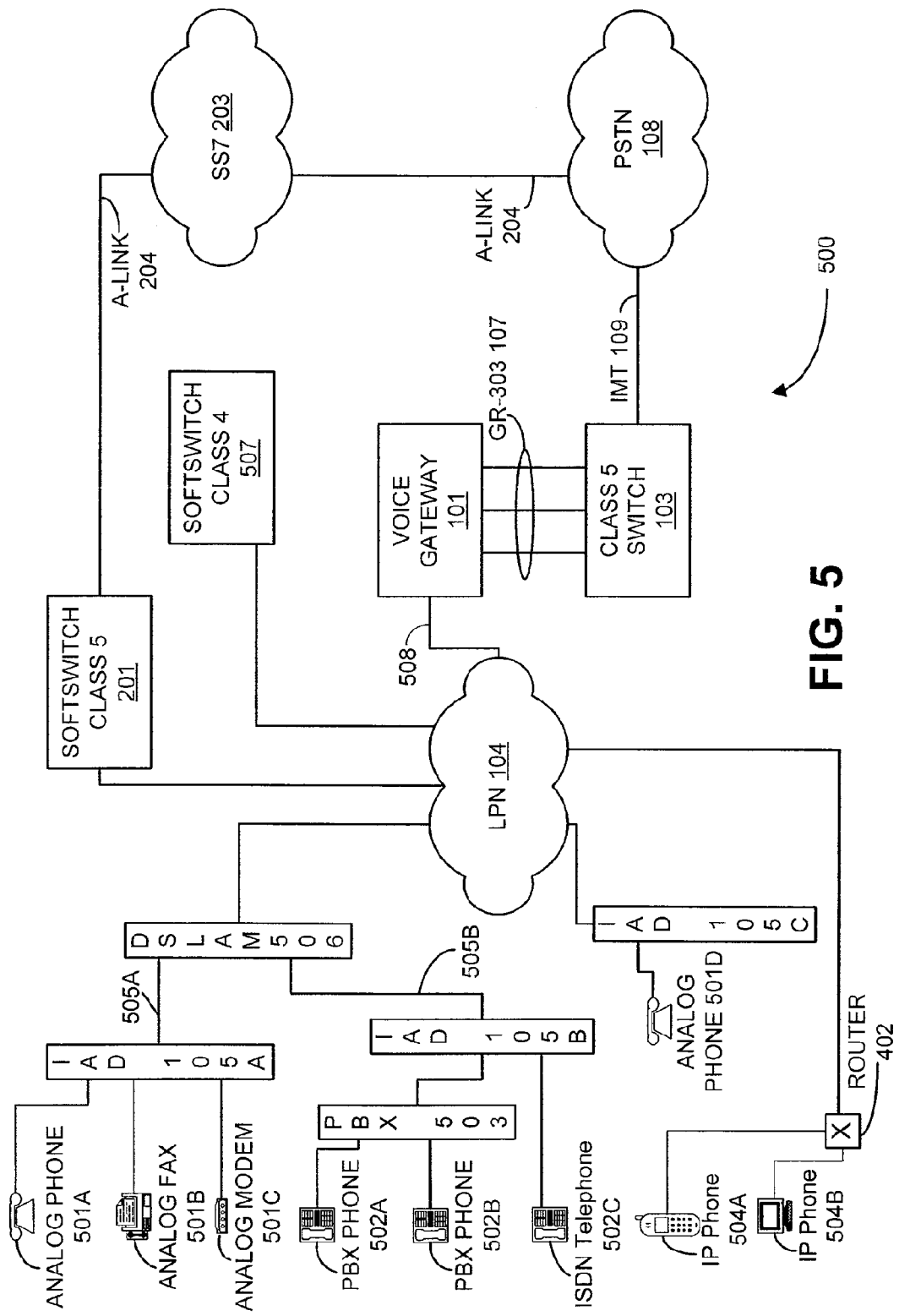
FIG. 5 is a block diagram illustrating a converged network with multiple call controllers and multiple protocols.

FIGS. 1-4 illustrate how voice-band calls are connected by voice gateway 101 through the packet and/or circuit-switched network, with each figure showing a voice-band call controlled by a different type of call controller. FIG. 5 is a block diagram illustrating a converged network 500 with multiple call controllers and multiple protocols. FIG. 5 focuses on the protocols used by various network elements, showing that voice gateway 101 is capable of supporting many different protocols, at many different layers, simultaneously. FIG. 5 does not show particular call paths. Thus, although each endpoint telephony device 501a-d, 502a-c, 504a-c in FIG. 5 can place and receive calls to each other endpoint telephony device, as well as to endpoint telephony devices on the PSTN and on the Internet, the path which these calls would take is not shown.

FIG. 5 shows several types of example endpoint telephony devices. Examples of analog telephony devices using the 0-4 kHz band, also known as Plain Old Telephone Service (POTS) devices, are: analog telephones 501a and 501d; analog fax machine 501b; and analog modem 501c. Digital telephony devices are represented by private branch exchange (PBX) telephones 502a, 502b and ISDN telephone 502c.

Each of these endpoint telephony devices relies on IAD 105 to convert voice signals (analog) or voice samples (digital) to voice packets for transport over LPN 104. Multiple IADs are shown. IAD 105a provides analog voice conversion to/from analog telephone devices 501a, 501b, 501c. IAD 105b provides digital voice conversion to/from PBX telephones 502a and 502b (coming through PBX 503) and from ISDN telephone 502c. IAD 105c provides analog voice conversion to/from analog telephone device 501d.

In contrast, the IP telephony devices 504a and 504b connect to LPN 104 through IP switch/router 402 rather than IAD 105. No IAD 105 is needed because IP telephony devices 504a, 504b transmit and receive voice packets using a suite of VoIP protocols such as SIP and Real Time Protocol (RTP). Examples of IP telephony devices include standalone IP phone 504a and a personal computer-based IP phone 504b.

IAD 105c connects directly to LPN 104, but IADs 105a, 105b do not. IADs 105a, 105b connect over digital subscriber loop (DSL) links 505a and 505b to an access multiplexer 506 which aggregates traffic from multiple IADs 105 before connection to LPN 104. Communications links 505a, 505b between IAD 105a, 105b and access multiplexer 506 use some form of voice over digital subscriber loop (VoDSL) to transport the voice over DSL. Although DSL is shown in this example, any digital transmission medium capable of carrying traffic from multiple subscribers simultaneously could be used. Alternative implementations could include broadband cable, or wireless local area networks such as those based on the Institute of Electrical and Electronic Engineers (IEEE) 802.11 standard.

IADs 105*a-c* may use various packet protocols on top of the physical/framing layer, for example, asynchronous transfer mode (ATM) or IP. ATM is well suited for voice traffic since it uses small, fixed-length cells which can be efficiently switched through the network (minimizing delay), and it provides many quality of service features. IP is another packet protocol often used for carrying voice. In its original form, IP was not well suited for voice traffic: it used variable rather than fixed-length packets; it was routed rather than switched; and it offered no quality of service features. However, many additions and extensions to IP, such as multi-protocol label switching (MPLS), resource reservation setup protocol (RSVP) and differentiated services (Diffserv), make today's IP suitable for voice traffic.

There are many different standards for carrying voice over a specific packet protocol. When ATM is used as the packet protocol, Voice Trunking using ATM Adaptation Layer 2 (AAL2), Loop Emulation Services using AAL2 and Circuit Emulation Services (CES) are common standards which specify how voice is coded and packaged into ATM cells. When ATM is the packet protocol and the voice coding standard isn't specified, the generic term Voice over ATM (VoATM) is used.

In this example, LPN 104 uses IP as the packet protocol and RTP to specify how voice is coded and packaged into the IP packets. RTP is one of a suite of protocols which are together referred to as VoIP. Other protocols in the VoIP suite include SIP, used to set up voice connections (i.e., call control), and session description protocol (SDP), used to describe the capabilities of each side of the connection.

IP and ATM can also be used in combination, a variation commonly referred to as IP over ATM" In that case (not shown), RTP may be used to carry voice over IP, and IP is carried over ATM.

The remaining network elements in FIG. 5 were already discussed with reference to FIGS. 1-4. Class 5 softswitch 201 and Class 4 softswitch 507 are both connected to LPN 104. In this example, the two softswitches use different call control protocols, SIP and MGCP. In this example, voice gateway 101 communicates with several other entities using different protocols over a single physical link 508. Therefore, link 508 carries several different protocols, for example, MGCP, SIP, VoATM and RTP. Class 5 switch 103 is connected to voice gateway 101 by GR-303 trunks 107. Class 5 switch 103 has multiple connections to PSTN 108, since voice and signaling are separate. Trunks 109 carry voice traffic to PSTN 108 while A-link connection 204 carries signaling messages to the SS7 network 203.

These protocols and standards are merely examples of packet protocols which are commonly used to carry voice. The present invention supports the use of different packet protocols and voice coding standards, and is not dependent on the use of those protocols described here. Furthermore, the invention supports the simultaneous use of multiple packet protocols and voice coding standards.

Figure 6A:
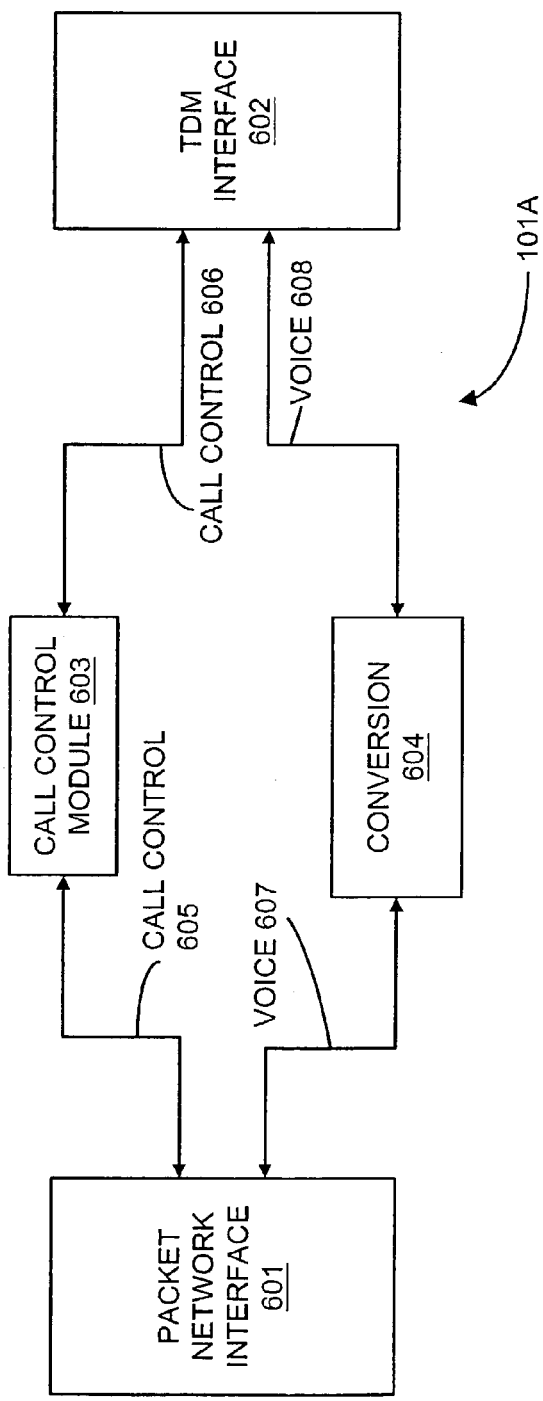
FIG. 6A is a block diagram of an embodiment of the invention that supports both both packet and Time Division Multiplexed (TDM) interfaces.

FIG. 6A is a block diagram of a voice gateway 101*a* which supports both packet and TDM interfaces. Voice gateway 101*a* includes packet network interface 601; TDM interface 602; call control module 603; and conversion module 604.

During a voice-band call, voice gateway 101*a* operates to cross-connect two voice streams under the direction of a call controller, while also providing any necessary conversion required. Voice packets entering voice gateway 101*a* may be carried in a timeslot or may be encapsulated in many different kinds of packets. In addition, a specific packet protocol may itself allow many different kinds of voice coding. Conversion may thus be required at the packet or timeslot level and at the voice coding level.

Voice packets and call control packets enter/exit voice gateway 101*a* through packet network interface 601 for transport to/from LPN 104. Voice gateway 101*a* also has a TDM interface 602, which transports timeslots carrying voice and call control to/from Class 5 switch 103. Incoming packets or timeslots which contain call control messages are sent over links 605 and 606 to call control module 603. Call control module 603 then: acts on the information; generates a call control message and transmits it to the sender (through either packet network interface 601 or TDM interface 602); generates a call control message and transmits it to the other side of the connection (through either packet network interface 601 or TDM interface 602); or any combination of these.

Voice packets and timeslots are handled as follows. Incoming voice packets from packet network interface 601 are sent over links 607 to conversion module 604. Conversion module 604 performs whatever coding conversion is required between the two sides of the connection, stuffs the newly coded voice payload into the appropriate timeslot, and sends the newly coded timeslot over link 608 for transmission by TDM interface 602. In the reverse direction, incoming voice timeslots from TDM interface 602 are sent over link 608 to conversion module 604. Conversion module 604 performs whatever coding conversion is required between the two sides of the connection, creates a packet to encapsulate the newly coded voice payload, and sends the newly coded packet over link 607 for transmission by packet network interface 601.

As an example, the call controller may direct voice gateway 101*a* to cross-connect a stream of voice carried in a particular timeslot with a stream of VoATM packets. In that case, conversion module 604 transcodes the voice payload carried in the particular timeslot from G.711-law to the particular code used by the VoATM stream, for example G.726. Conversion module 604 then stuffs the newly coded voice payload into ATM packets according to the whatever VoATM standard is in use (Voice Trunking over AAL2, CES, etc.).

Figure 6B:
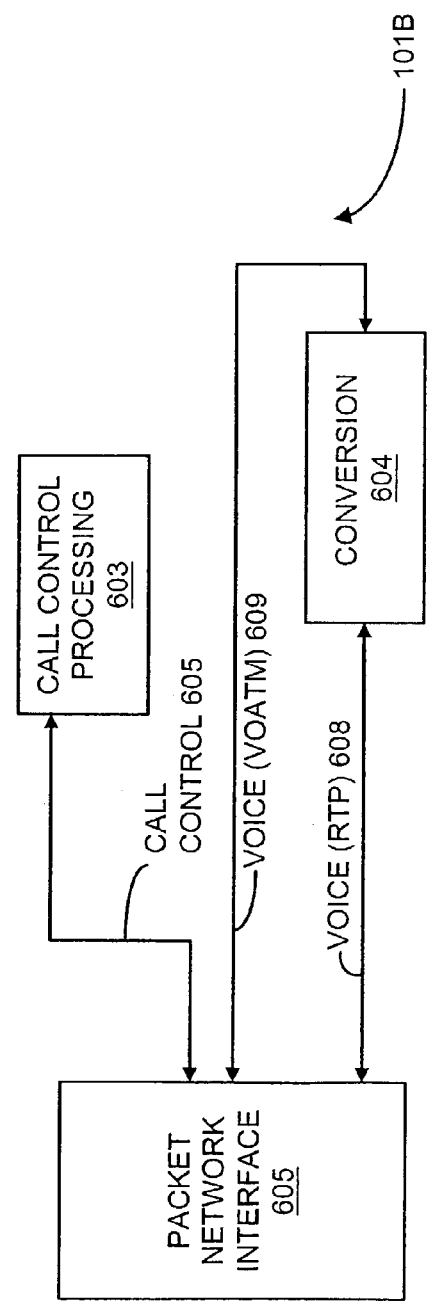
FIG. 6B is a block diagram of another embodiment of the invention that supports multiple types of voice packets but not TDM.

FIG. 6B is a block diagram of another voice gateway 101*b* which supports multiple types of voice packets but not TDM. Voice gateway 101 includes packet network interface 601, call control module 603, and conversion module 604. In this configuration, voice may be encapsulated in different kinds of packets (e.g. ATM or IP), each with different kinds of voice coding. Conversion may thus be required at the packet level and at the voice coding level.

This embodiment works similarly to the embodiment in FIG. 6A, except that there is no TDM interface. Instead, two different streams of packets enter through packet network interface 601, through links 608 and 609. As before, packets containing signaling information are acted on by call control module 603, while conversion module 604 performs whatever conversion is needed on the voice packets.

As an example, the call controller may direct voice gateway 101*b* to cross-connect a stream of VoATM packets with a stream of RTP packets. In that case, conversion module 604 transcodes the voice payload carried in the VoATM packet from G.726 to G.729. Conversion module 604 then creates an RTP packet to encapsulate the newly coded voice payload.

Many other variations of packet and timeslot conversion are possible, and the above are intended only as examples. Conversion module 604 may be implemented as a single module which handles many different types of conversions, or as multiple modules, each performing a specific conversion type.

For ease of illustration, only TDM-packet conversion was discussed with reference to FIG. 6A and only packet-packet conversion was discussed with reference to FIG. 6B. However, the voice gateway 101a shown in FIG. 6A can also perform conversions between multiple packet types as discussed with reference to FIG. 6B.

Figure 7:
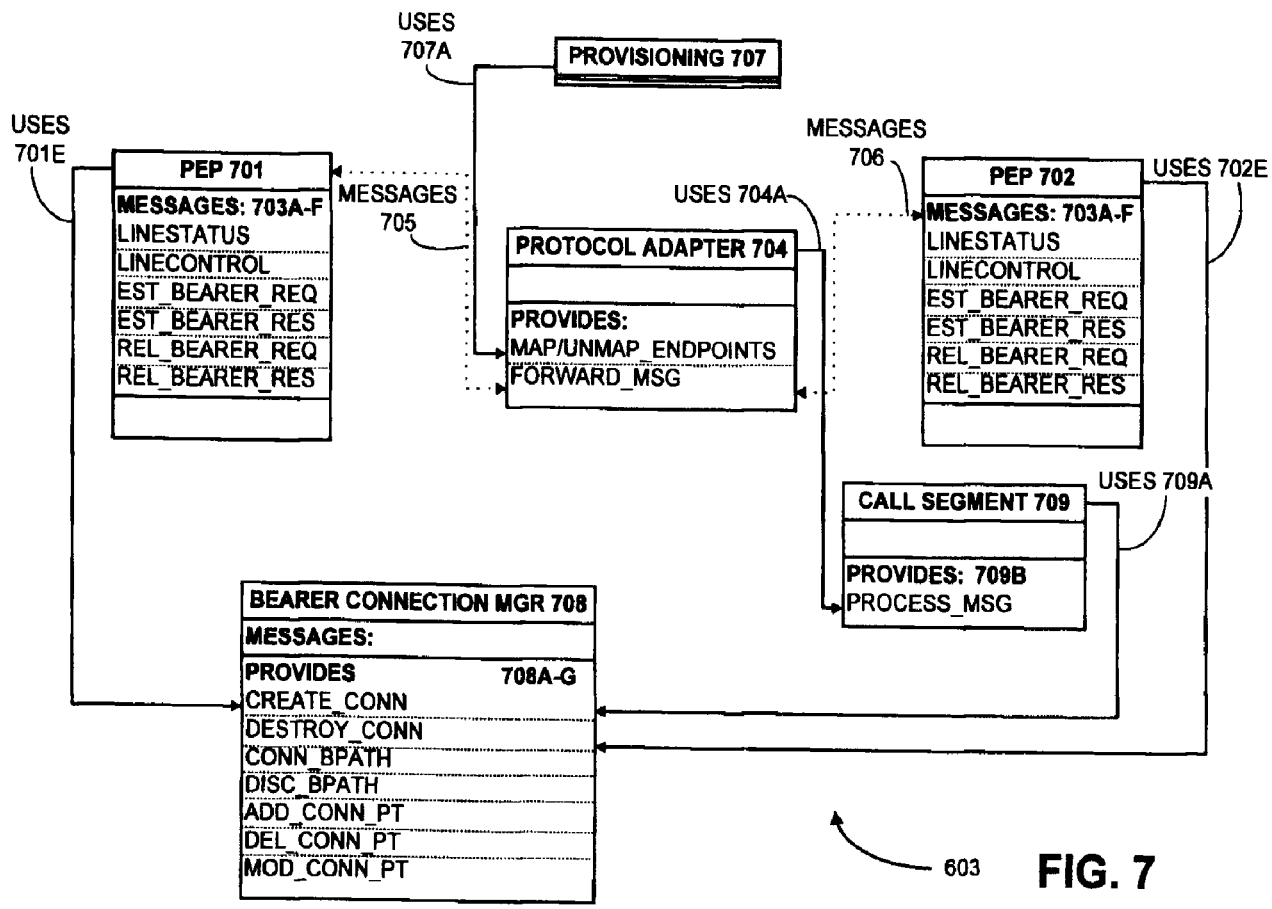
FIG. 7 is an object diagram of one embodiment of the call control module from FIGS. 6A and 6B.
Figure 10A:
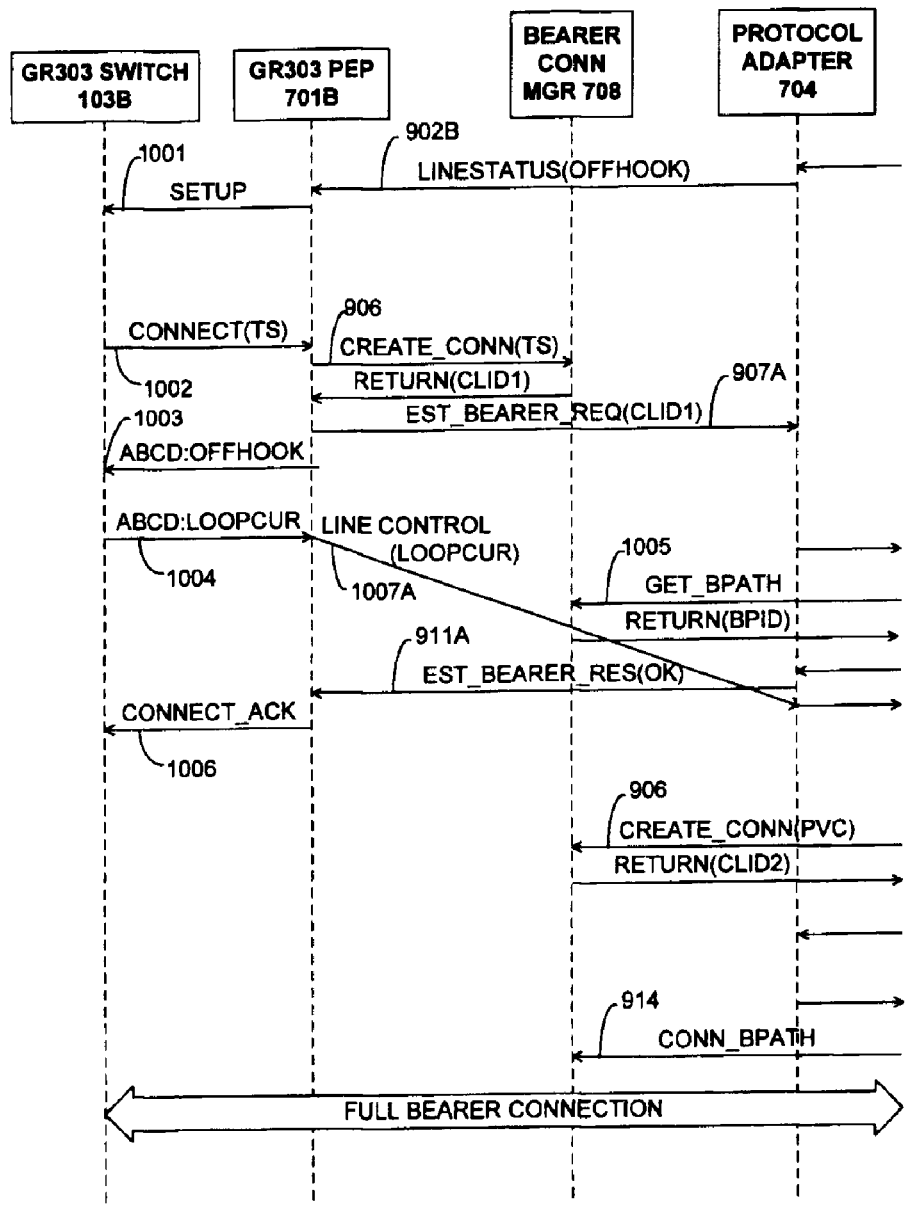
Figure 11A:
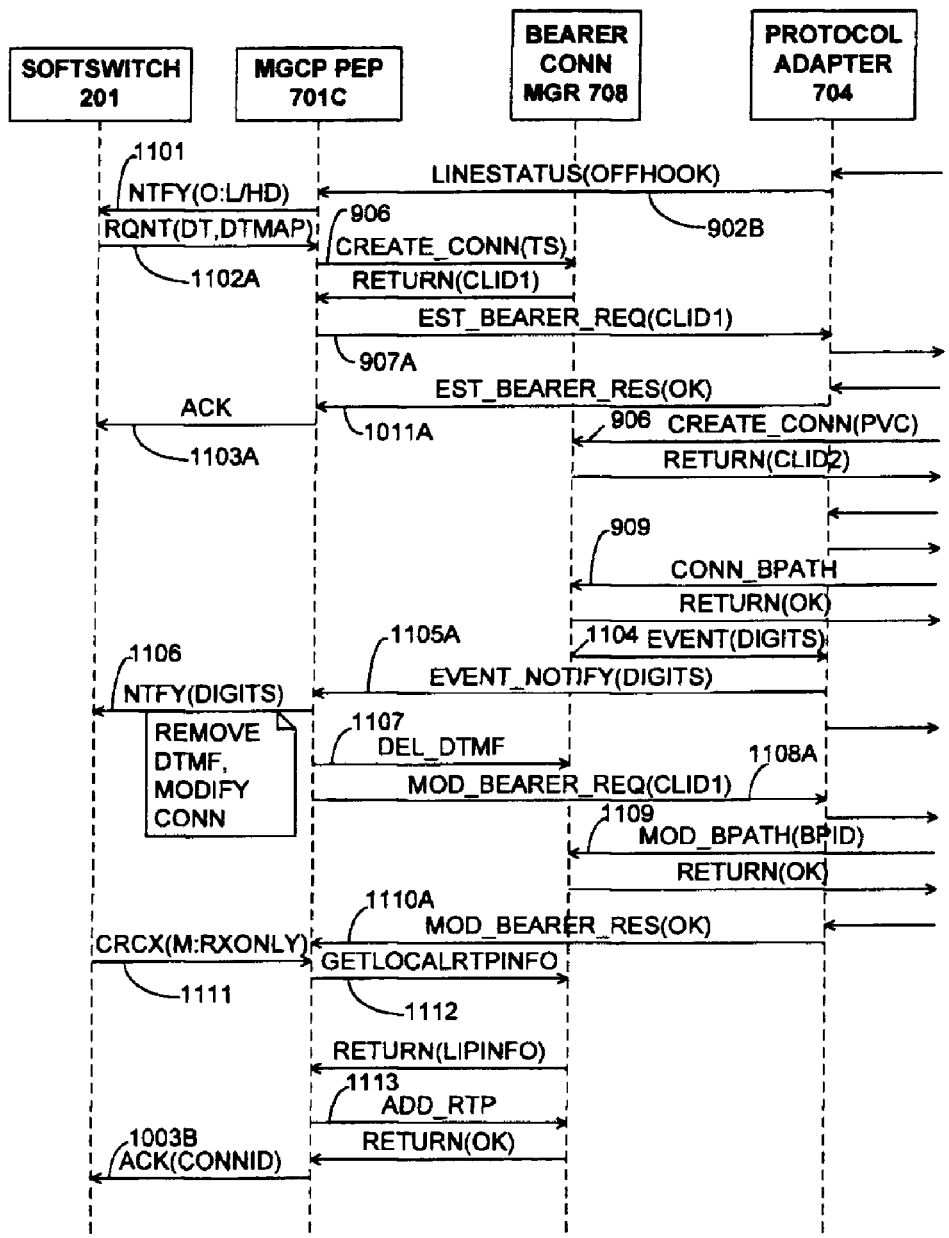
Figure 11B:
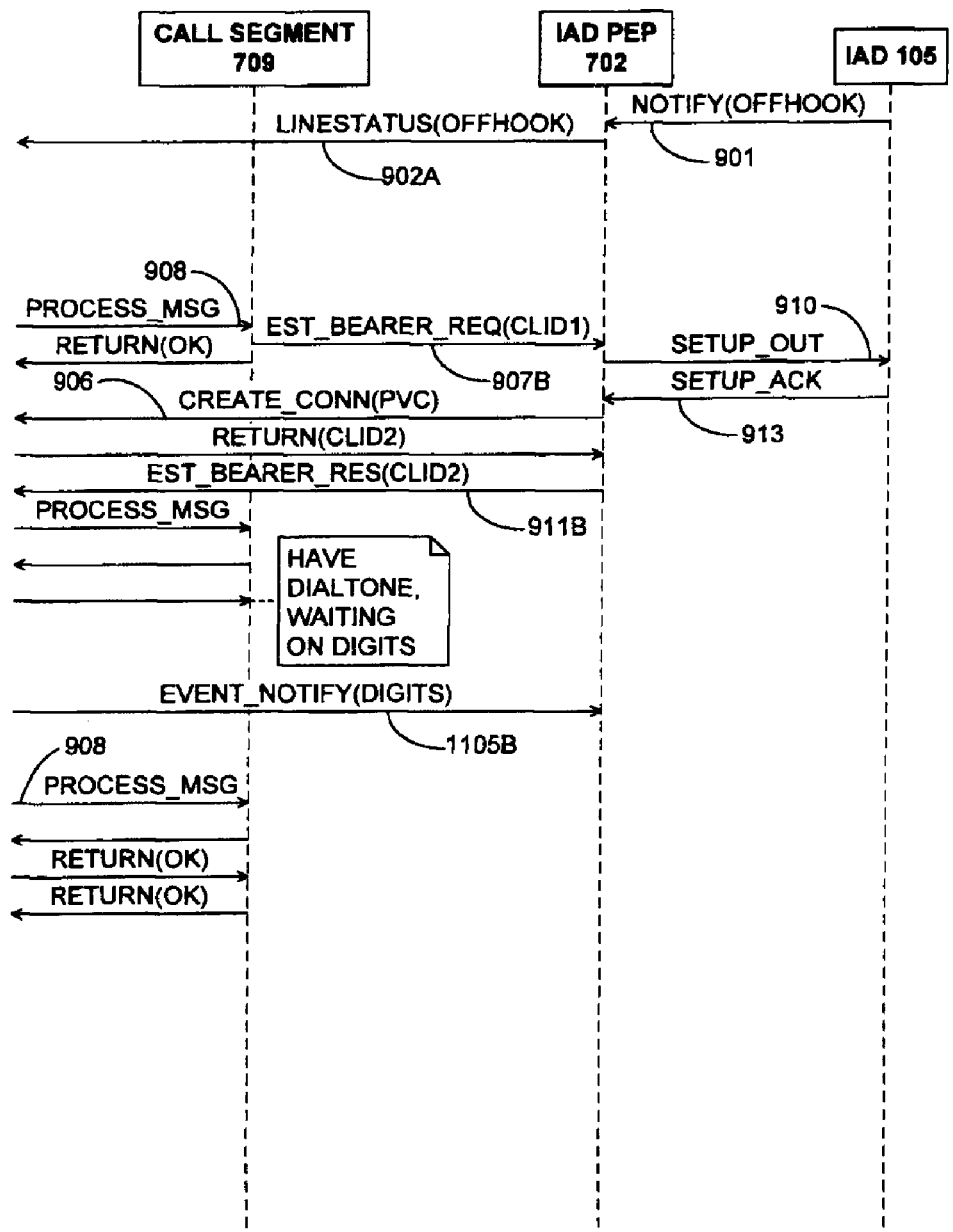
Figure 11D:
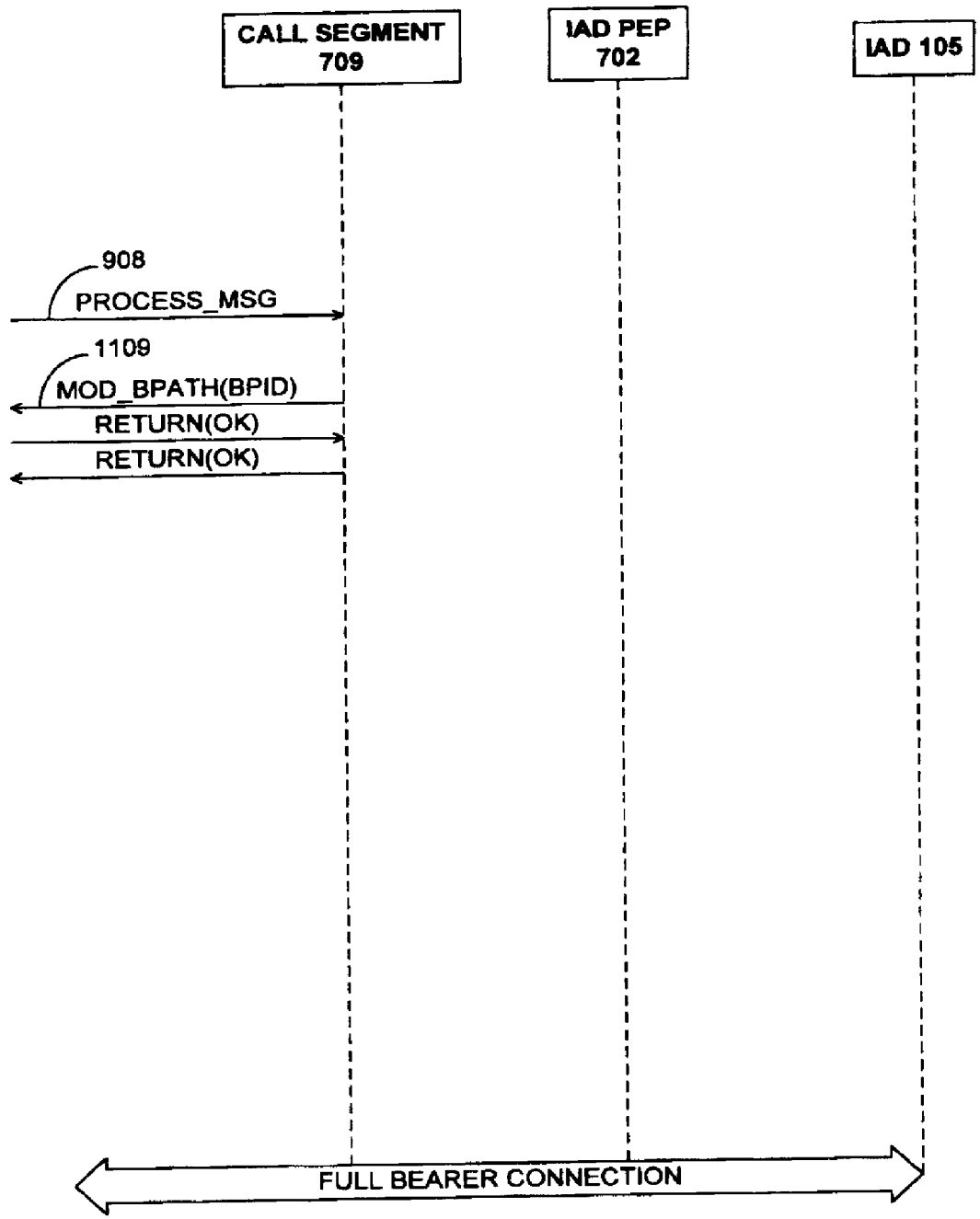
Figure 12A:
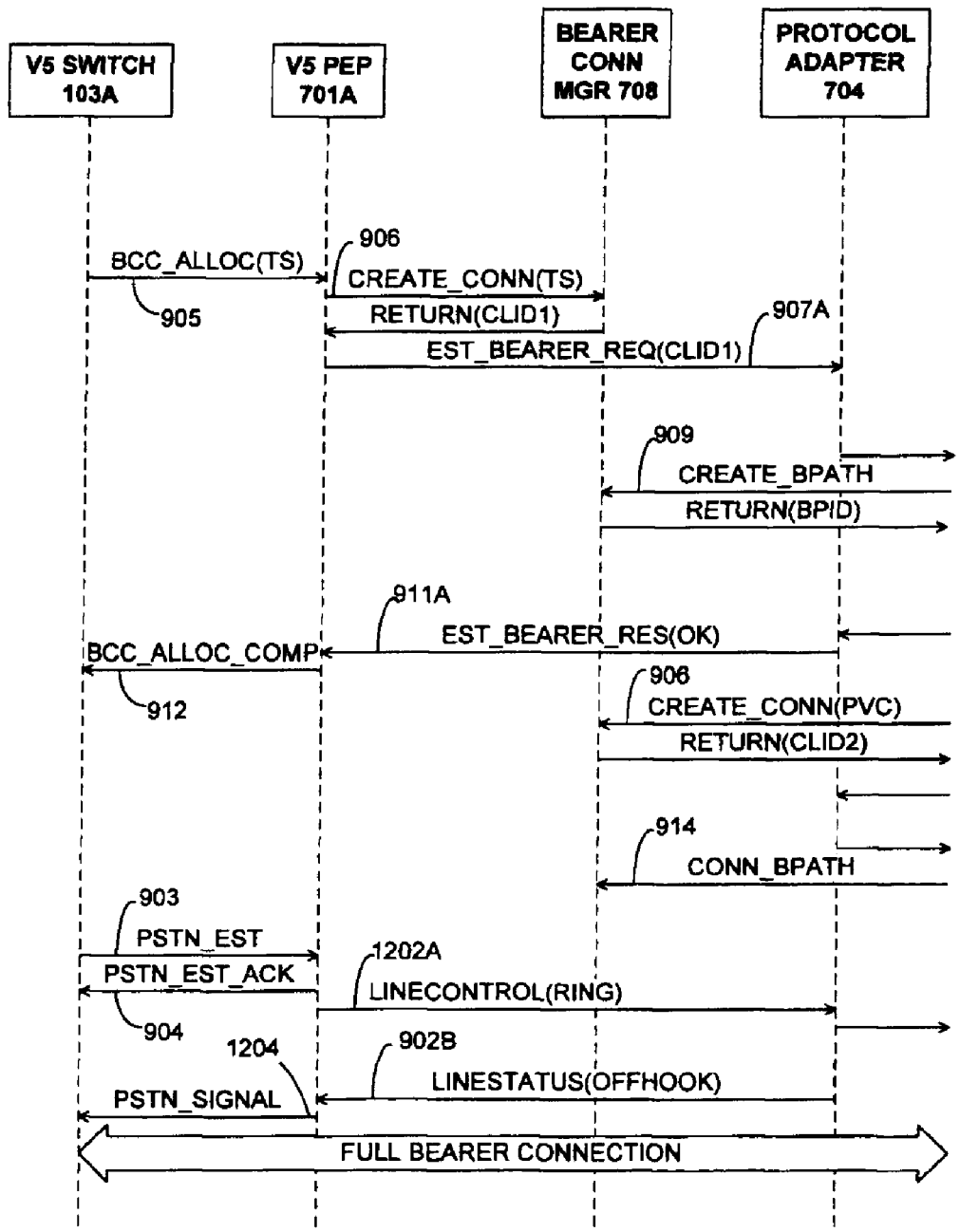
Figure 12B:
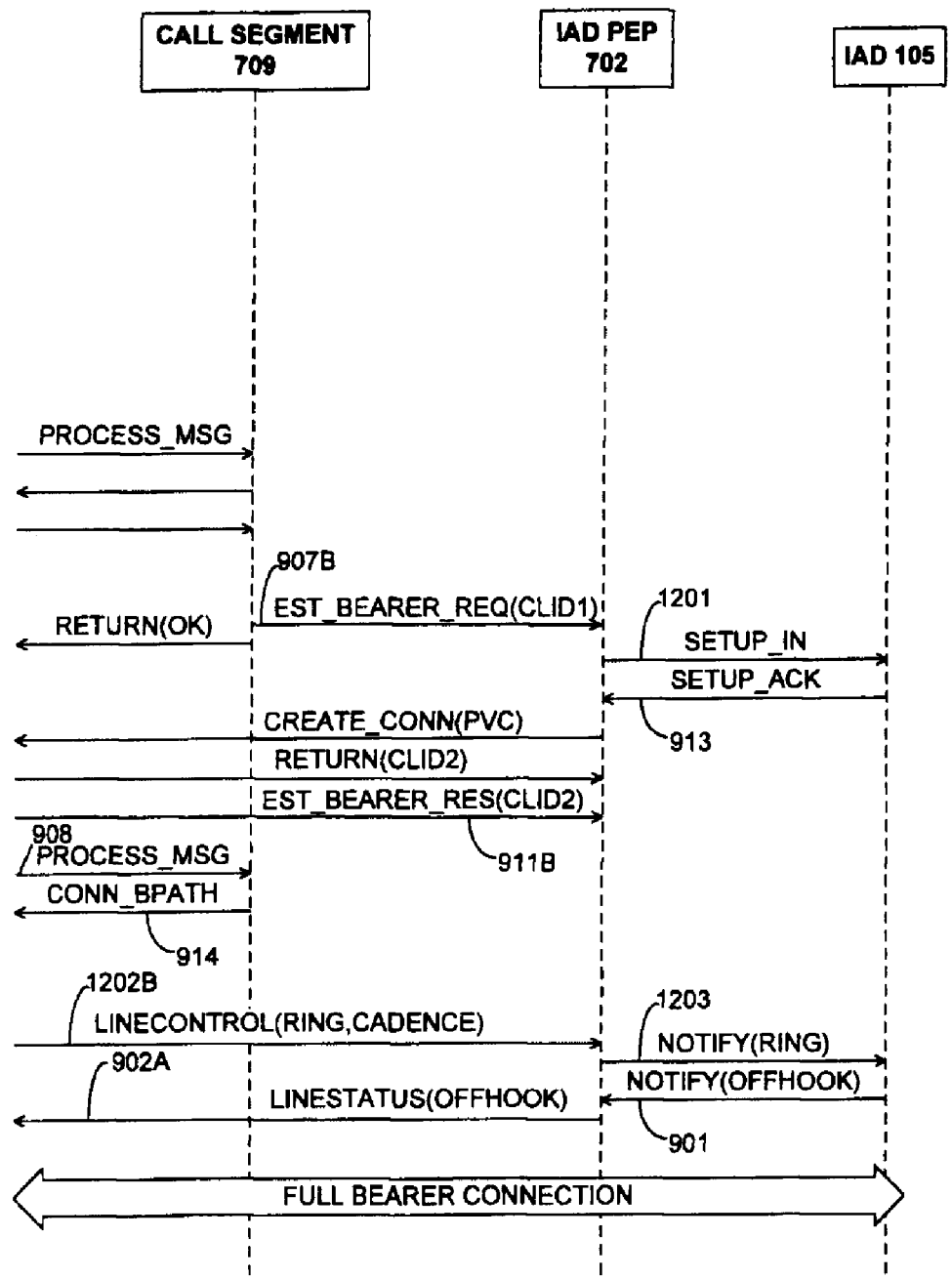
Figure 13A:
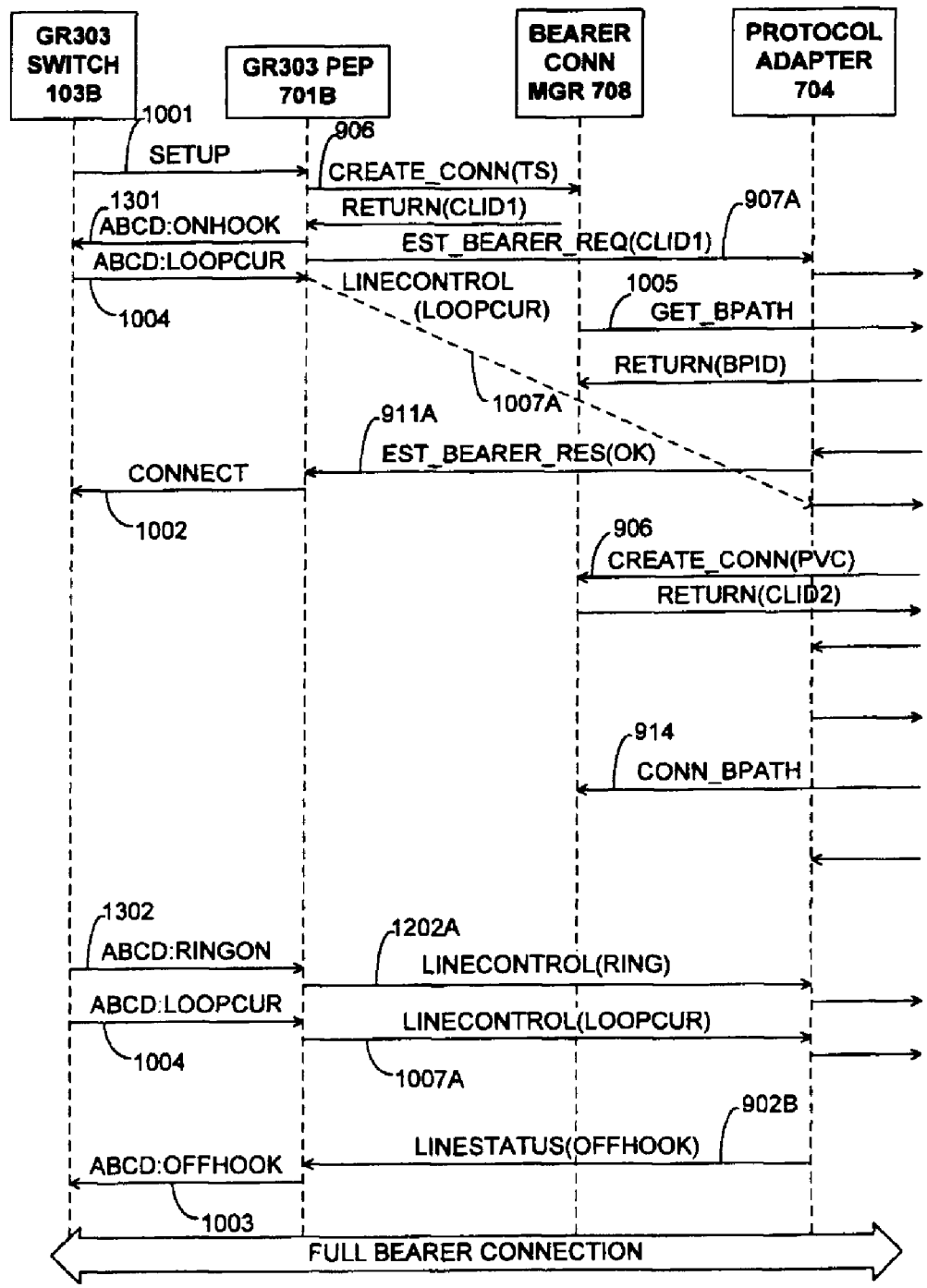
Figure 13B:
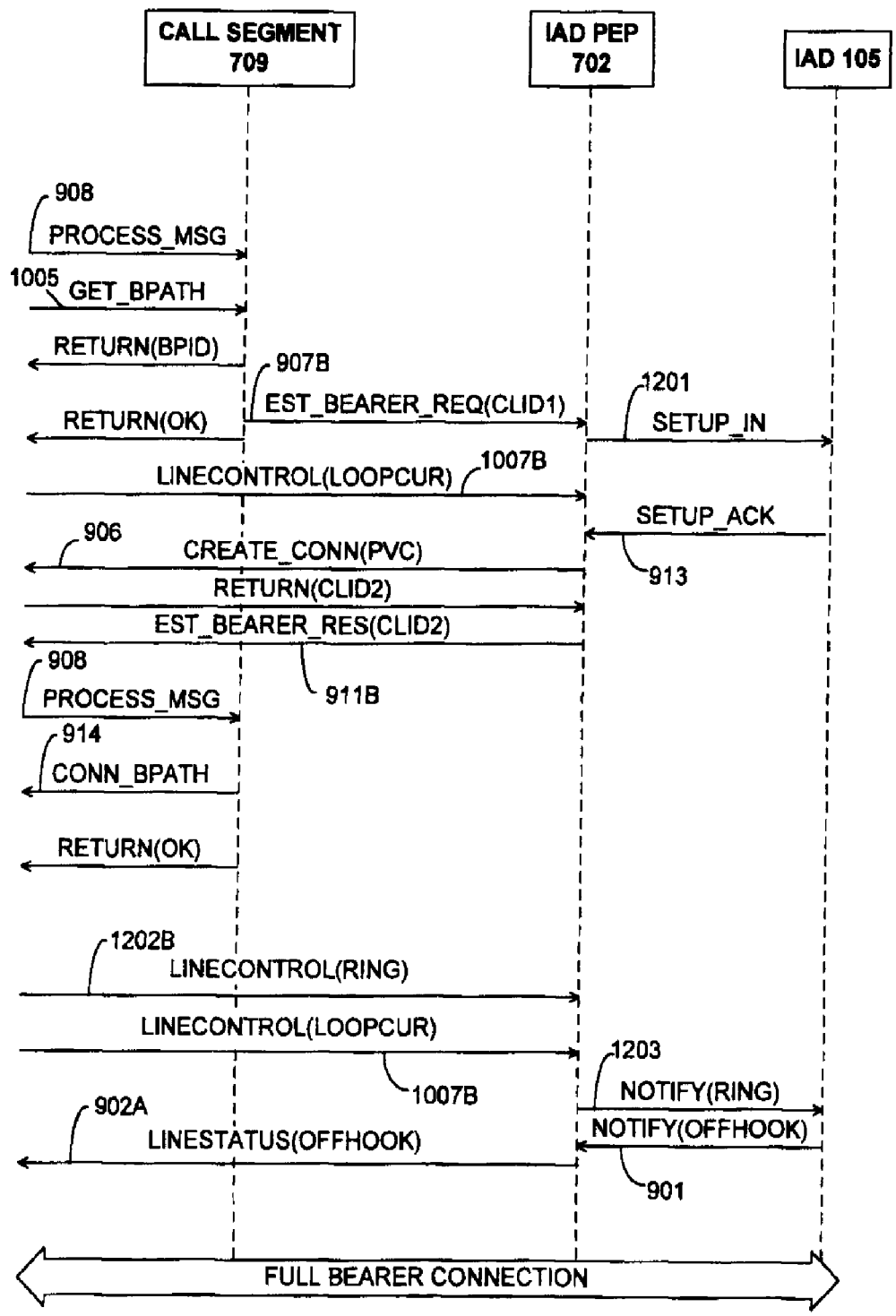

FIG. 7 is an object diagram of the call control module 603 from FIGS. 6A & 6B. Protocol Endpoint (PEP) 701 and Protocol Endpoint 702 represent unique call processing entities, corresponding to a particular port on either an IAD 105 or a call controller. For example, if the voice gateway 101 is in communication with two IADs 105 and a Class 5 switch 103, Protocol Endpoint 701 may correspond to port 3 on one of the IADs 105, and Protocol Endpoint 702 may correspond to the GR-303 interface on the Class 5 switch 103. The call control module 603 performs call control by receiving and processing call control messages from these interfaces at Protocol Endpoints 701, 702, and by routing call control messages between Protocol Endpoints 701, 702.

Protocol Endpoints 701, 702 handle two different types of messages. External messages (not shown) are received from either the IAD 105 or the call controller, and are protocol-specific. For example, the IAD 105 supports one set of external messages, a GR-303 interface supports another, and a MGCP interface supports yet another. All Protocol Endpoints 701, 702 support the same set of internal messages 703. Each Protocol Endpoint 701, 702 maps each external (protocol-specific) message to an appropriate internal message 703a-f for communication with another endpoint. Internal messages 703a-f include: LINESTATUS, LINECONTROL, EST_BEARER_REQ, EST_BEARER_RES, REL_BEARER_REQ, and REL_BEARER_RES. (These internal messages are discussed in more detail with reference to FIGS. 9-12.)

Protocol Endpoint 701 and Protocol Endpoint 702 do not exchange internal messages 703 directly. Rather, Protocol Adapter 704 operates to route messages between the two, allowing them to exchange internal messages 703 indirectly. This indirect linkage (shown by links 705 and 706) allows Protocol Endpoint 701 and Protocol Endpoint 702 each to be aware that it is communicating with another endpoint, but not specifically which one. The correspondence between Protocol Endpoint 702 and Protocol Endpoint 701 is established when the Provisioning object 707 uses the services of Protocol Adapter 704 (shown by link 707a) to map a pair of endpoints together.

In some embodiments, the Protocol Endpoint 702 implements all protocol-specific call processing, for example, through the use of protocol-specific state machines. In other embodiments, a collection of Protocol Endpoints of the same protocol type (e.g. GR-303, V5, MGCP, etc.) may be managed by a separate Protocol Provider object (not shown), and this separate object may implement some protocol-specific call processing which is common to all of the managed Protocol Endpoints.

Other objects provide additional services used by Protocol Adapter 704 and Protocol Endpoints 701, 702. Bearer Connection Manager 708 (Bearer Conn Mgr) provides services 708a-g to manage bearer connections, each of which consists of two connection points. These services 708a-g allow for creating (CREATE_CONN) and destroying (DESTROY_CONN) a bearer connection, connecting (CONN_BPATH) and disconnecting (DISC_BPATH) the two connection points in a bearer connection, adding (ADD_CONN_PT) and deleting (DEL_CONN_PT) a connection point, and modifying of the characteristics of a bearer connection (MOD_CONN_PT). These services 708a-g are used by Protocol Endpoints 701, 702, as shown by links 701a and 702a.

Call Segment 709 handles all bearer-related call control messages, and connects/disconnects the bearer path when appropriate, as shown by link Call Segment 709a. Call Segment 709 also provides a service 709b (PROCESS_MSG) to process bearer-related call processing messages. This service 709b is used by Protocol Adapter 704, as shown by link 704a.

Figure 8:
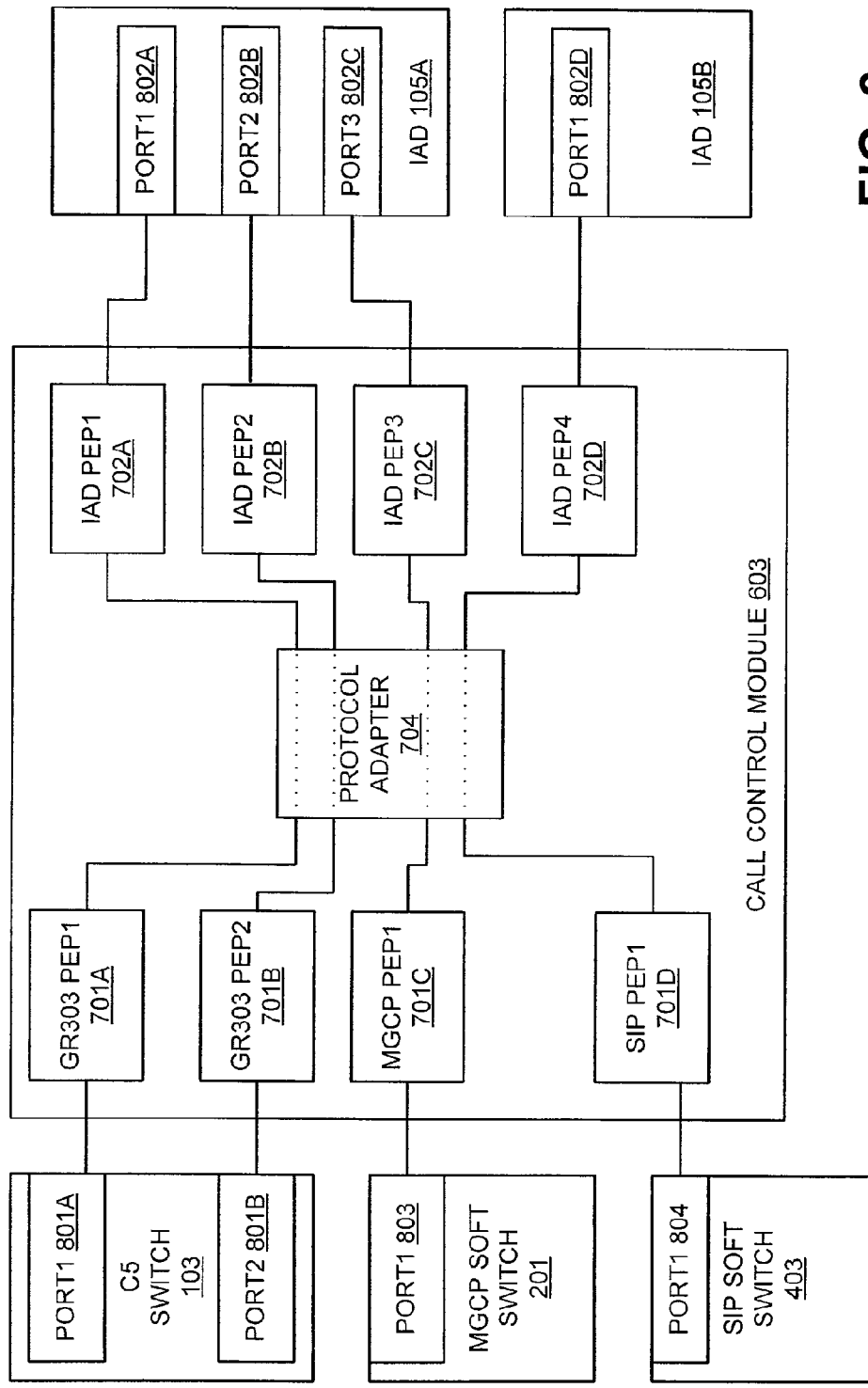
FIG. 8 is a diagram illustrating how one embodiment of the call control module supports multiple call controllers simultaneously.

FIG. 8 illustrates how call control module 603 supports multiple call controllers simultaneously through the use of multiple Protocol Endpoints. On the trunk side, call control module 603 in voice gateway 101 receives call control messages from several call controllers: Class 5 switch 103, softswitch 201, SIP softswitch 403. On the subscriber side, call control module 603 interfaces with two different IADs, 105a and 105b. As discussed with reference to FIG. 7, call control module 603 contains several software components, including Protocol Adapter 704 and one or more pairs of Protocol Endpoints 701, 702, with each endpoint corresponding to a port on either a switch or an IAD. In this example, Protocol Adapter 704 routes between four different pairs of Protocol Endpoints: 801a-d and 802a-d.

Class 5 switch 103 has two ports, 801a and 801b, in communication with call control module 603. Each communicates with a corresponding Protocol Endpoint in call control module 603: port 801a communicates with GR-303 Protocol Endpoint 701a; port 801b communicates with GR-303 Protocol Endpoint 701b. Protocol Adapter 704 routes messages between GR-303 Protocol Endpoints 701a, 701b and IAD Protocol Endpoints 702a, 702b. IAD Protocol Endpoints 702a and 702b in turn communicate with ports 802a and 802b on IAD 105a.

MGCP Softswitch 201 has a single port, 803, in communication with MGCP Protocol Endpoint 701c in call control module 603. Protocol Adapter 704 routes messages between MGCP Protocol Endpoint 701c and IAD Protocol Endpoint 702c. IAD Protocol Endpoint 702c communicates with a third port, 802c, on IAD 105a.

SIP softswitch 403 has a single port, 804, in communication with SIP Protocol Endpoint 701d in call control module 603. Protocol Adapter 704 routes messages between SIP Protocol Endpoint 701d and IAD Protocol Endpoint 702d. In this case, IAD Protocol Endpoint 702d communicates with a port, 802d, on a different IAD 105b.

FIG. 8 thus illustrates two different aspects of the invention. First, Protocol Endpoints 701, 702 in the call control module 603 allow the same IAD 105a to handle calls from multiple call controllers (Class 5 switch 103, and softswitch 201, and SIP softswitch 403). Second, Protocol Endpoints 701, 702 support multiple IADs 105 as well as multiple call controllers. The abstraction provided by Protocol Endpoints 701, 702 allows calls to be placed between any combination of call controllers and IADs 105.

FIGS. 9-13 are sequence diagrams illustrating interactions within call control module 603 during various call scenarios involving different types of call controllers. These figures show that the software architecture of the call control module 603, which encapsulates protocol-specific details in Protocol Endpoint 701 and Protocol Endpoint 702, allow many of the object interactions to be similar even though the direction of the call and the type of call controller varies. The object interactions required to establish a bearer connection between the two Protocol Endpoints is similar in each diagram because the two endpoints use a internal message set to establish the connection. In contrast, protocol-specific actions are limited to the interaction between a Protocol Endpoint and its external controller. In each of these diagrams, Protocol Endpoint 702 corresponds to the IAD Protocol Endpoint, while Protocol Endpoint 701 corresponds to the call controller Protocol Endpoint.

Figure 9A:
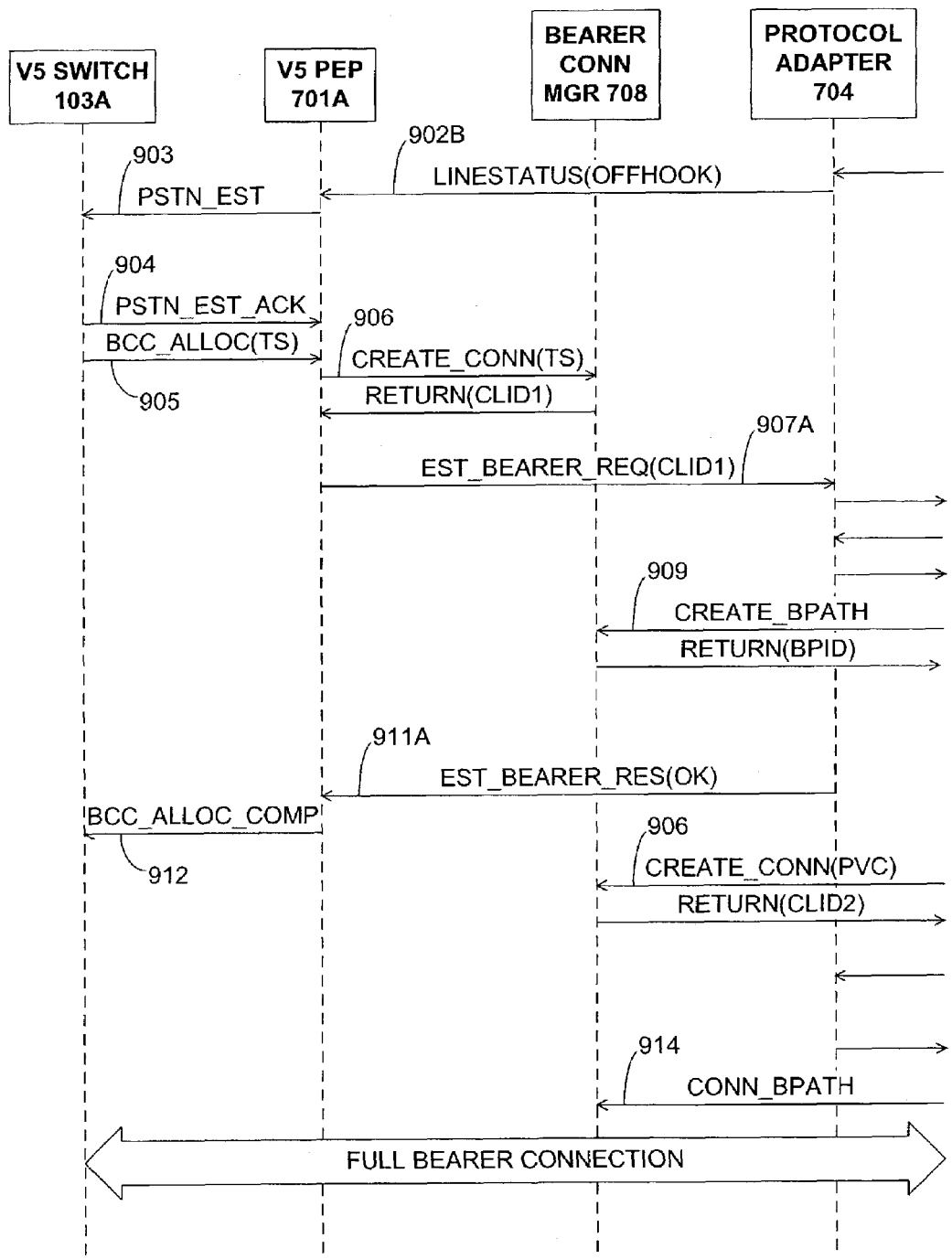
FIGS. 9A & 9B are a sequence diagram of object interactions for an incoming call to a Class 5 switch using the European Standards Telecommunications Institute (ETSI) V5 protocol. The diagram illustrates the interactions between objects in one embodiment of the call control module.
Figure 9B:
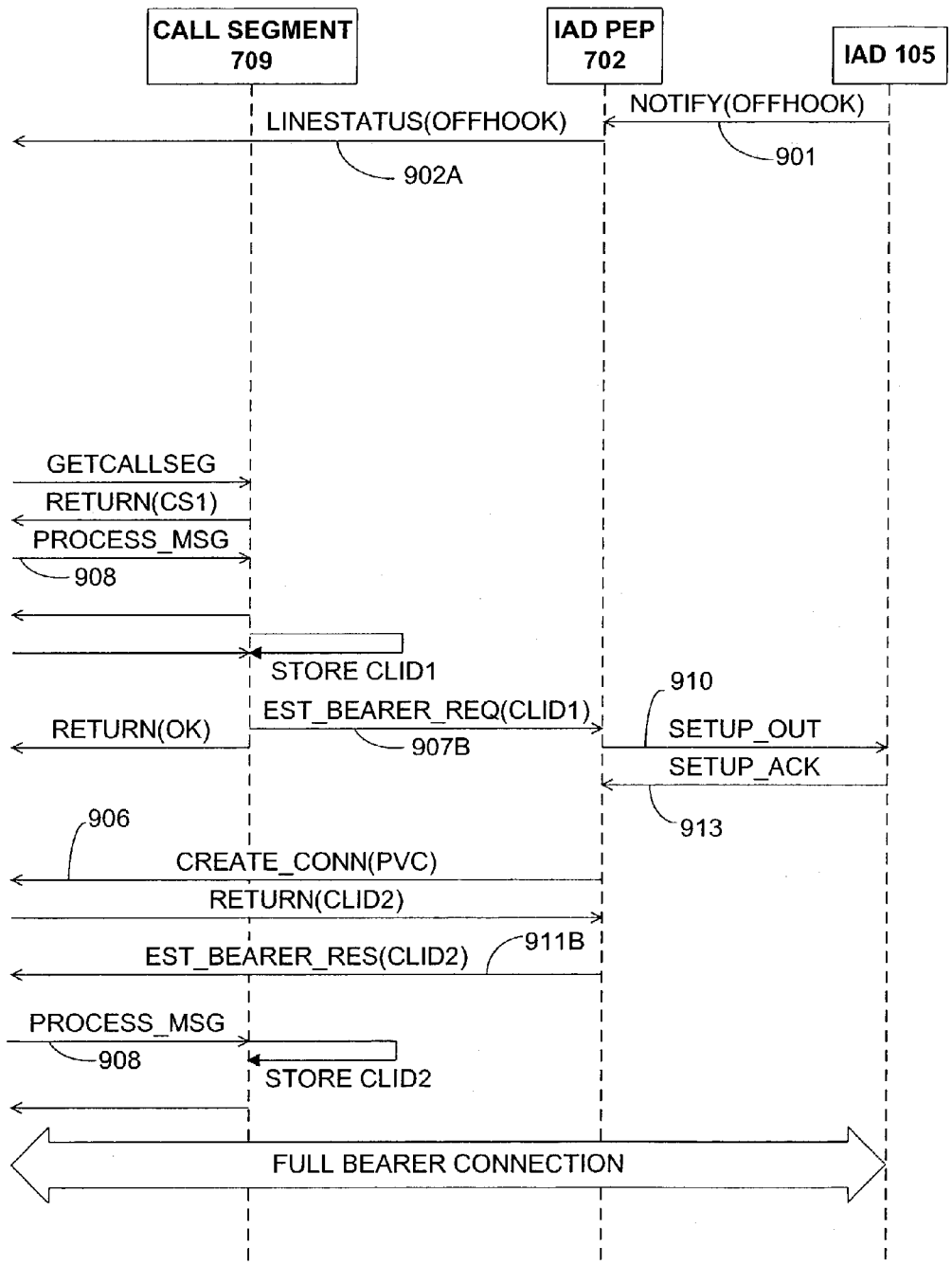

FIGS. 9A & B, viewed together, illustrate the interactions within call control module 603 during an outgoing call from the IAD 105 to a Class 5 switch 103a using V5 as the call control protocol. The incoming call begins in FIG. 9B when the subscriber telephony device 102a goes offhook. IAD 105 reports this by sending a Notify (Offhook) message 901 to IAD Protocol Endpoint 702. IAD Protocol Endpoint 702 maps the Notify (Offhook) message 901, which is specific to the IAD protocol, to a LineStatus (Offhook) message 902a, which is one of the internal messages, and passes it on to the Protocol Adapter 704. Protocol Adapter 704 passes the message on, as LineStatus (Offhook) message 902b, to peer V5 Protocol Endpoint 701a. V5 Protocol Endpoint 701a acts on the LineStatus (Offhook) message 902b by mapping it to a PSTN_EST message 903, which is specific to the V5 protocol, and sending the PSTN_EST message 903 to switch 103a. Switch 103a responds with a protocol-specific PSTN_EST_ACK message 904, followed by a BCC_ALLOC message 905 which indicates which timeslot should be connected to the subscriber port that is managed by the peer protocol endpoint.

V5 Protocol Endpoint 701a acts on the BCC_ALLOC message 905 by calling function Create_Conn 906 in BearerConnectionMgr 708 to create a connection identifier corresponding to the timeslot. V5 Protocol Endpoint 701a next begins the process of setting up its half of the bearer connection by sending Est_Bearer_Req message 907a to Protocol Adapter 704, including the connection identifier. Protocol Adapter 704 acts on the bearer request by calling function Process_Msg 908 in Call Segment 709 to process the Est_Bearer_Req message 907a. Call Segment 709 acts on the message by using function Create_BPath 909 in BearerConnectionMgr 708 to create a bearer path between V5 Protocol Endpoint 701a and IAD Protocol Endpoint 702.

Call Segment 709 finishes processing of the Est_Bearer_Req message 907a by forwarding the message on to IAD Protocol Endpoint 702, as Est_Bearer_Req message 907b. IAD Protocol Endpoint 702 maps this internal message to the IAD-specific message SETUP_OUT 910, and sends SETUP_OUT 910 on to IAD 105. After forwarding the Est_Bearer_Req message 907b, Call Segment 709 returns to Protocol Adapter 704.

Protocol Adapter 704 notifies V5 Protocol Endpoint 701 that its bearer request has been completed by sending a Est_Bearer_Res message 911a. V5 Protocol Endpoint 701 then maps this internal message to the V5-specific message BCC_ALLOC_COMP 912, and sends BCC_ALLOC_COMP 912 to switch 103a, informing switch 103a that the timeslot has been allocated for the offhook subscriber's port.

IAD Protocol Endpoint 702 receives a SETUP_ACK 913 from IAD 105 in response to the SETUP_OUT 910 message. IAD Protocol Endpoint 702 acts on the message SETUP_ACK 913 by calling function Create_Conn 906 in BearerConnectionMgr 708 to create a connection identifier corresponding to the virtual circuit in use by the offhook subscriber. IAD Protocol Endpoint 702 finishes setting up its half of the bearer connection by sending an Est_Bearer_Res message 911b to Protocol Adapter 704, including the connection identifier. Protocol Adapter 704 acts on the bearer response by calling the function Process_Msg 908 in Call Segment 709.

In the last step in connecting the incoming call from IAD 105, Call Segment 709 acts on the bearer response message by calling function Connect_BPath 914 using BearerConnectionMgr 708 to connect the bearer path between the two connection ids. The call control module 603 has now connected the particular timeslot coming through the V5 TDM interface 602 from switch 103a, to the virtual circuit coming through the packet network interface 601 from IAD 105. The Class 5 switch 103a will now perform its "Class 5" functions by playing dialtone over the connection, receiving digits, and acting on the digits to route the call to another Class 5 switch 103.

Figure 10A:
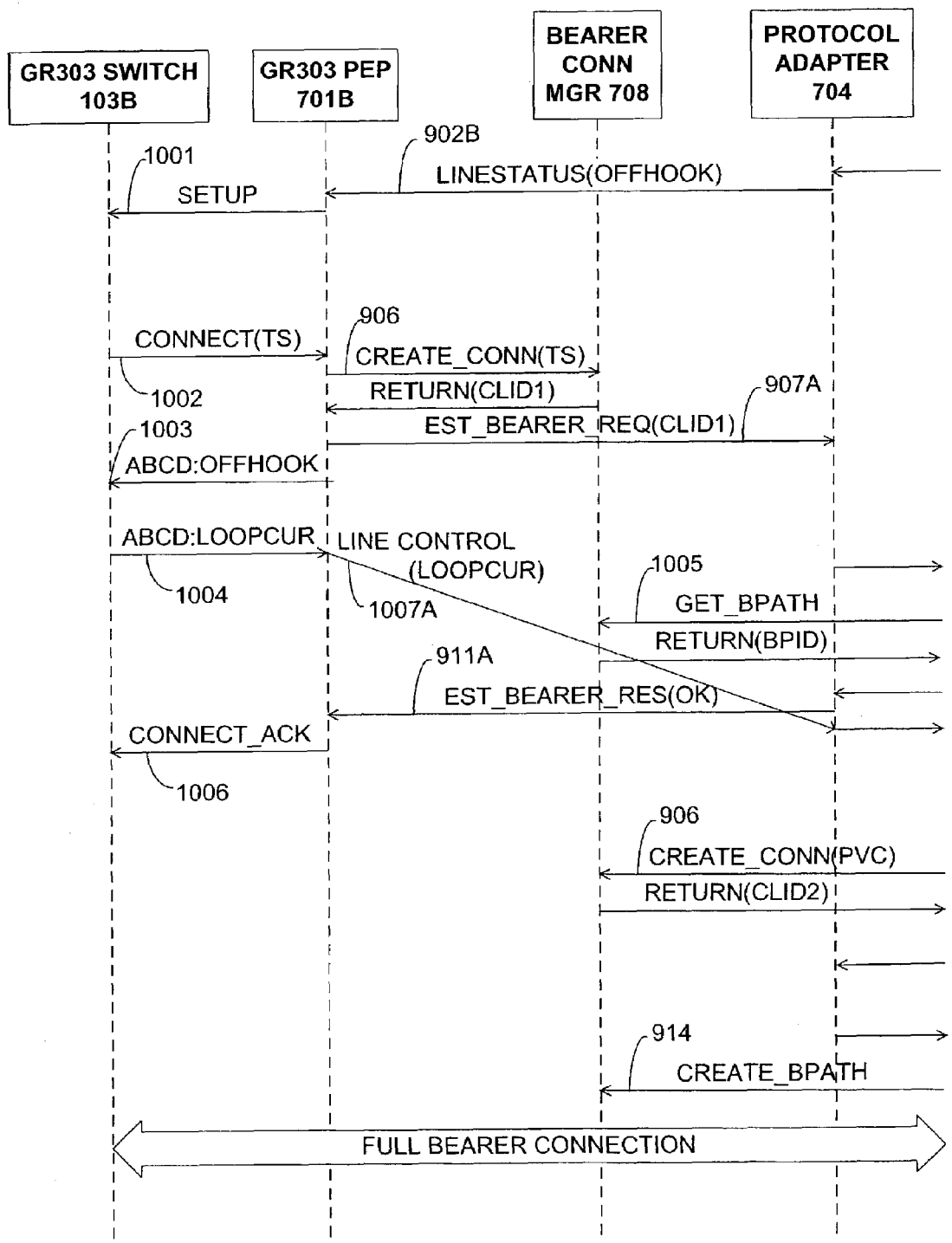
FIGS. 10A & 10B are a sequence diagram of object interactions for an incoming call to a Class 5 switch using the General Requirements 303 (GR-303) protocol. The diagram illustrates the interactions between objects in one embodiment of the call control module.
Figure 10B:
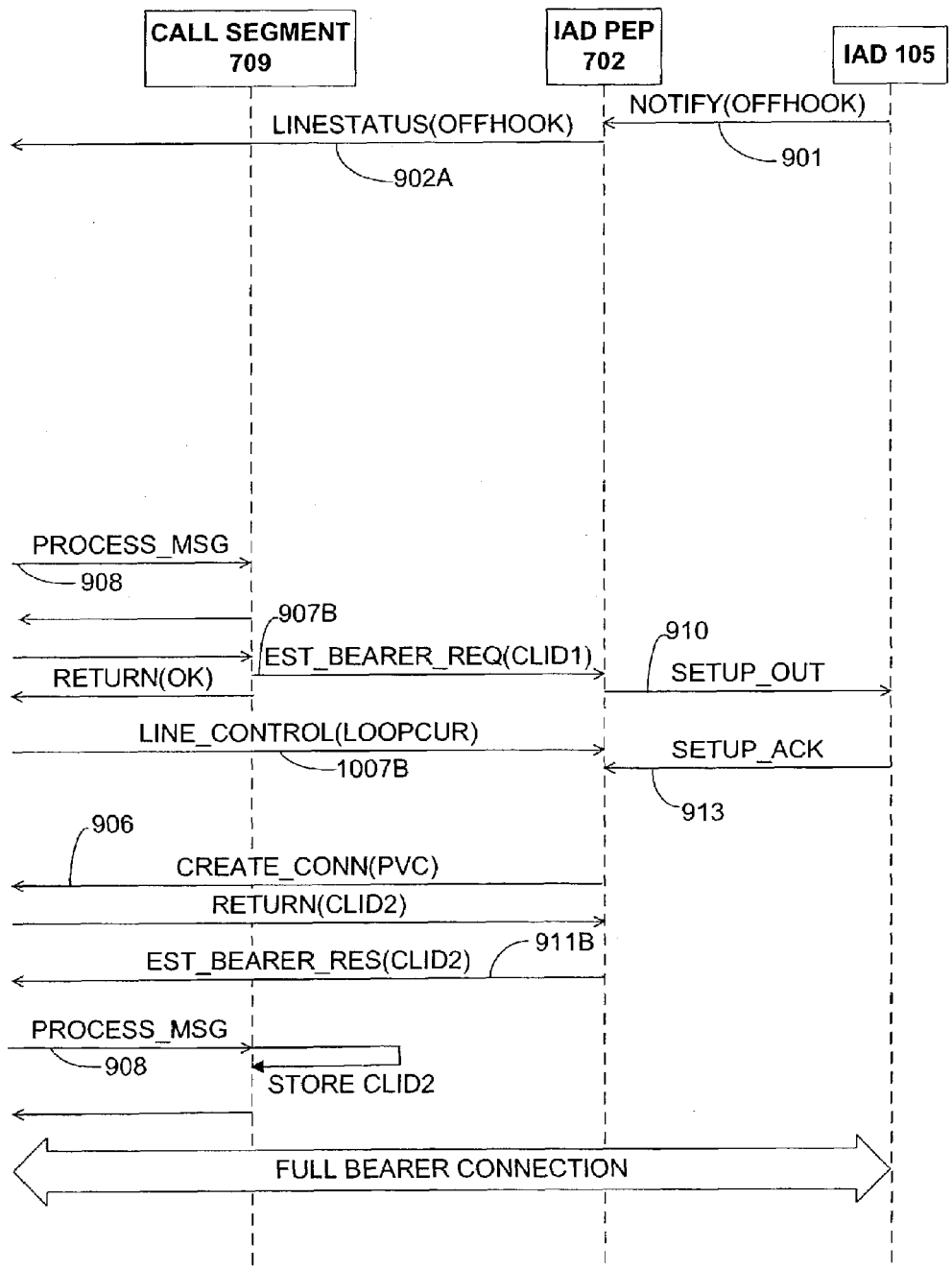

FIGS. 10A & B, viewed together, illustrate the interactions within call control module 603 during an outgoing call from the IAD 105 to a Class 5 switch 103b using GR-303 as the call control protocol. The incoming call begins in FIG. 10B when the subscriber telephony device 102a goes offhook. IAD 105 reports this by sending a Notify (Offhook) message 901 to IAD Protocol Endpoint 702. IAD Protocol Endpoint 702 maps the Notify (Offhook) message 901, which is specific to the IAD protocol, to a LineStatus (Offhook) message 902, which is one of the internal messages 703, and passes it on to the Protocol Adapter 704. Protocol Adapter 704 passes the message on, as LineStatus (Offhook) message 902b, to peer GR303 Protocol Endpoint 701b. GR303 Protocol Endpoint 701b acts on the LineStatus (Offhook) message 902b by mapping it to a SETUP message 1001, which is specific to the GR303 protocol, and sending the SETUP message 1001 to switch 103b. Switch 103b responds with a protocol-specific CONNECT message 1002 which indicates which timeslot should be connected to the subscriber port that is managed by the peer protocol endpoint.

GR303 Protocol Endpoint 701b acts on the CONNECT message 1002 by calling function Create_Conn 906 in BearerConnectionMgr 708 to create a connection identifier corresponding to the timeslot. GR303 Protocol Endpoint 701b next begins the process of setting up its half of the bearer connection by sending Est_Bearer_Req message 907a to Protocol Adapter 704, including the connection identifier. GR303 Protocol Endpoint 701b also sends the protocol-specific ABCD:Offhook message 1003 to Switch 103b. Switch 103b responds by sending ABCD:LoopCur message 1004 to GR303 Protocol Endpoint 701b. GR303 Protocol Endpoint 701b doesn't act on this message yet, but waits until its outstanding bearer request to Protocol Adapter 704 is complete.

Protocol Adapter 704 acts on the bearer request by calling function Process_Msg 908 in Call Segment 709 to process the Est_Bearer_Req message 907a. Call Segment 709 acts on the message by using function Get_BPath 1005 in BearerConnectionMgr 708 to retrieve the identifier of the bearer path between GR303 Protocol Endpoint 701b and IAD Protocol Endpoint 702.

Call Segment 709 finishes processing of the Est_Bearer_Req message 907a by forwarding the message on to IAD Protocol Endpoint 702, as Est_Bearer_Req message 907b. IAD Protocol Endpoint 702 maps internal message to the TAD-specific message SETUP_OUT 915, and sends SETUP_OUT 910 on to IAD 105. After forwarding the Est_Bearer_Req message 907b, Call Segment 709 returns to Protocol Adapter 704.

Protocol Adapter 704 notifies GR303 Protocol Endpoint 701b that its bearer request has been completed by sending a Est_Bearer_Res message 911a. GR303 Protocol Endpoint 701*b* then maps this internal message to the GR303-specific message CONNECT_ACK 1006, and sends CONNECT_ACK 1006 to switch 103*b*, informing switch 103*b* that the timeslot has been allocated for the offhook subscriber's port.

Protocol Adapter 704 also acts on the cached ABCD: LoopCur message 1004 by mapping it to the internal message LineControl(LoopCurr) 1007*a* and sending the LineControl (LoopCurr) 1007*a* message to the Protocol Adapter 704. Protocol Adapter 704 forwards the message, as LineControl (LoopCurr) 1007*b*, on to peer IAD Protocol Endpoint 702. However, IAD Protocol Endpoint 702 doesn't send the LineControl(LoopCurr) 1007*b* on to IAD 105 until after a SETUP_ACK 913 is received in response to the SETUP_OUT 910.

IAD Protocol Endpoint 702 receives a SETUP_ACK 913 from IAD 105 in response to the SETUP_OUT 910 message. IAD Protocol Endpoint 702 acts on the message SETUP_ACK 913 by calling function Create_Conn 906 in BearerConnectionMgr 708 to create a connection identifier corresponding to the virtual circuit in use by the offhook subscriber. IAD Protocol Endpoint 702 finishes setting up its half of the bearer connection by sending an Est_Bearer_Res message 911*b* to Protocol Adapter 704, including the connection identifier. Protocol Adapter 704 acts on the bearer response by calling the function Process_Msg 908 in Call Segment 709.

In the last step in connecting the incoming call from IAD 105, Call Segment 709 acts on the bearer response message by calling function Connect_BPath 914 in BearerConnectionMgr 708 to connect the bearer path between the two connection identifiers. The call control module 603 has now connected the particular timeslot coming through the GR-303 TDM interface 602 from switch 103*b* to the virtual circuit coming through the packet network interface 601 from IAD 105. The Class 5 switch 103*b* will now perform its Class 5 functions by playing dialtone over the connection, receiving digits, and acting on the digits to route the call to another Class 5 switch 103.

FIGS. 11A-D, viewed together, illustrate the interactions within call control module 603 during an outgoing call from the IAD 105 to a Class 5 softswitch 201 using MGCP as the call control protocol. The incoming call begins in FIG. 11A when the subscriber telephony device 102*a* goes offhook. IAD 105 reports this by sending a Notify (Offhook) message 901 to IAD Protocol Endpoint 702. IAD Protocol Endpoint 702 maps the Notify (Offhook) message 901, which is specific to the IAD protocol, to a LineStatus (Offhook) message 902, which is one of the internal messages 703, and passes it on to the Protocol Adapter 704. Protocol Adapter 704 passes the LineStatus (Offhook) message 902*b* on to peer MGCP Protocol Endpoint 701*c*.

MGCP Protocol Endpoint 701*c* acts on the LineStatus (Offhook) message 902*b* by mapping it to an MGCP-specific Ntfy (Offhook) message 1101, and sending the Ntfy (Offhook) message 1101 to MGCP softswitch 201. Softswitch 201 responds to the Ntfy (Offhook) message 1101 with a protocol-specific RqNt message 1102*a* which requests notification when digits have been collected.

In order to collect digits, the MGCP Protocol Endpoint 701*c* establishes a bearer path, connecting one end to IAD Protocol Endpoint 702. However, the other end of the path is not connected through to the call controller (softswitch 201). Instead, the other end of the path is connected to a DTMF detector which also plays dialtone. The object interactions required to establish this bearer path are similar to the previous figures, except that MGCP Protocol Endpoint 701*c* asks BearerConnectionMgr 708 to create a connection identifier which corresponds to dialtone instead of a timeslot assigned by the switch. When the bearer path has been established, MGCP Protocol Endpoint 701 c sends an MGCP Ack message 1103*a* to softswitch 201.

BearerConnectionMgr 708 will notify Protocol Adapter 704 when the user has finished dialing digits by sending an Event message 1104 containing the digits. Protocol Adapter 704 forwards the Event message 1203, translated into internal message Event_Notify 1105*a* and 1205*b*, to both peer protocol endpoints. IAD Protocol Endpoint 702 ignores this message, while MGCP Protocol Endpoint 701*c* acts on it by sending a MGCP Ntfy (Digits) message 1106 to softswitch 201.

MGCP Protocol Endpoint 701*c* calls the Del_DTMF function 1107 in BearerConnectionMgr 708 to remove the DTMF detector from the bearer path. MGCP Protocol Endpoint 701 also notifies Protocol Adapter 704 that the characteristics of the bearer path have changed, by sending a Mod_Bearer_Req message 1108*a*. Protocol Adapter 704 acts on the bearer request by calling the Mod_BPath 1109 function in Call Segment 709. Call Segment 709 uses the Process_Msg 908 in BearerConnectionMgr 708 to modify the bearer path identifier as requested. When Call Segment 709 has returned, Protocol Adapter 704 notifies MGCP Protocol Endpoint 701*c* that its bearer request has completed by sending MGCP Protocol Endpoint 701*c* a Mod_Bearer_Res message 1110*a*.

At this point, softswitch 201 has processed the dialed digits and is ready to connect the voice gateway 101, and thus the subscriber telephony device 102*a*, to the remote telephony device. Connecting the two sides of the call is a two-step process, which involves the creation of a receive-only connection which has only a single end (the voice gateway 101), followed by modification of the same connection in order to add in the remote side. Softswitch 201 obtains the IP address and port of MGCP Protocol Endpoint 701*c* by sending a MGCP CrCx message 1111. MGCP Protocol Endpoint 701*c* acts on this message by calling GetLocalRtpInfo 1112 in BearerConnectionMgr 708 to get the local IP address and RTP port, then calling AddRtp 1113 to associate this local address/port with the connection identifier already obtained. MGCP Protocol Endpoint 701*c* then sends the address/port back to softswitch 201 in a MGCP Ack message 1103*b* responding to the MGCP CrCx message 1111.

Figure 11A:
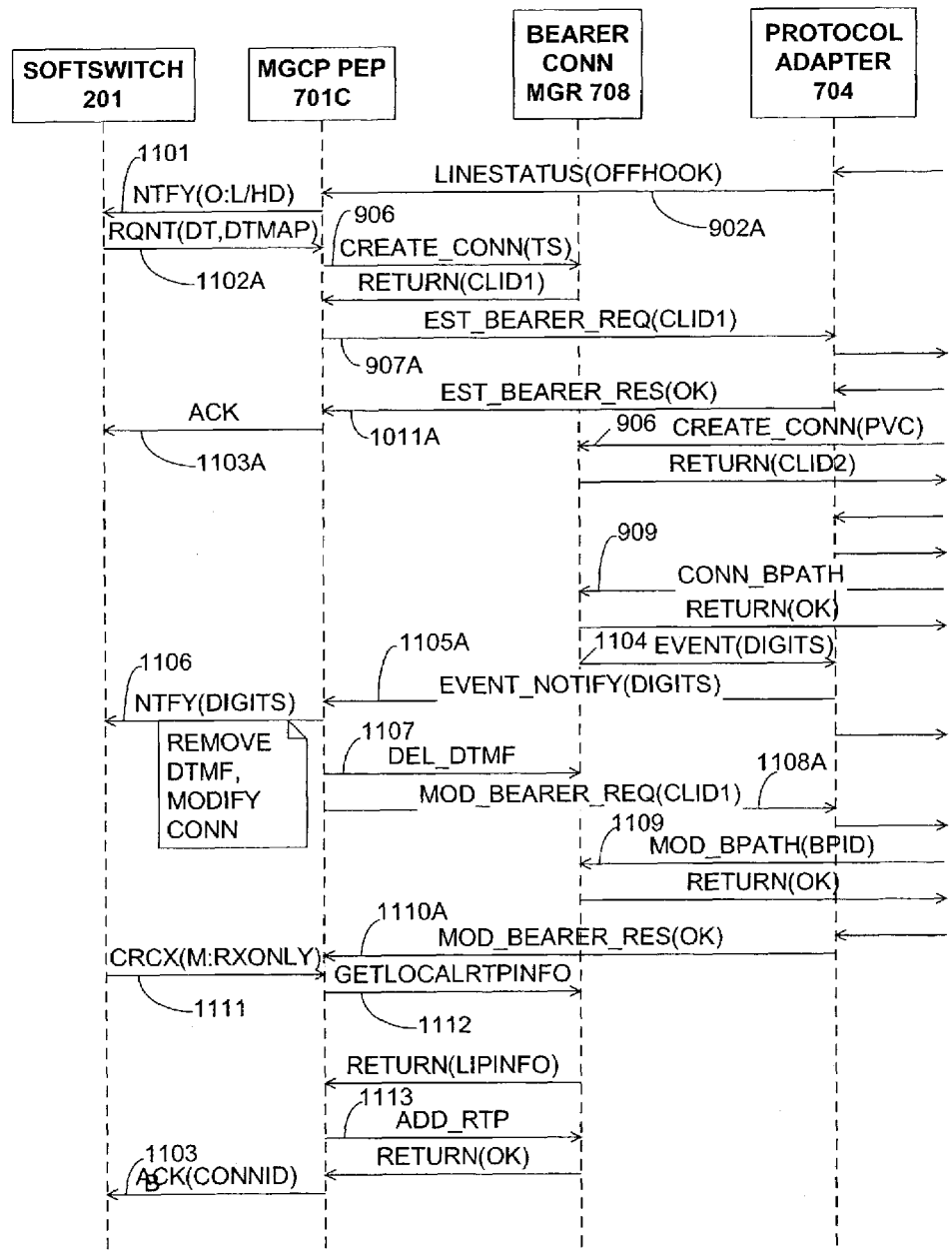
FIGS. 11A-D are a sequence diagram of object interactions for an incoming call to a Class 5 softswitch using the Media Gateway Control Protocol (MGCP) protocol. The diagram illustrates the interactions between objects in one embodiment of the call control module.
Figure 11B:
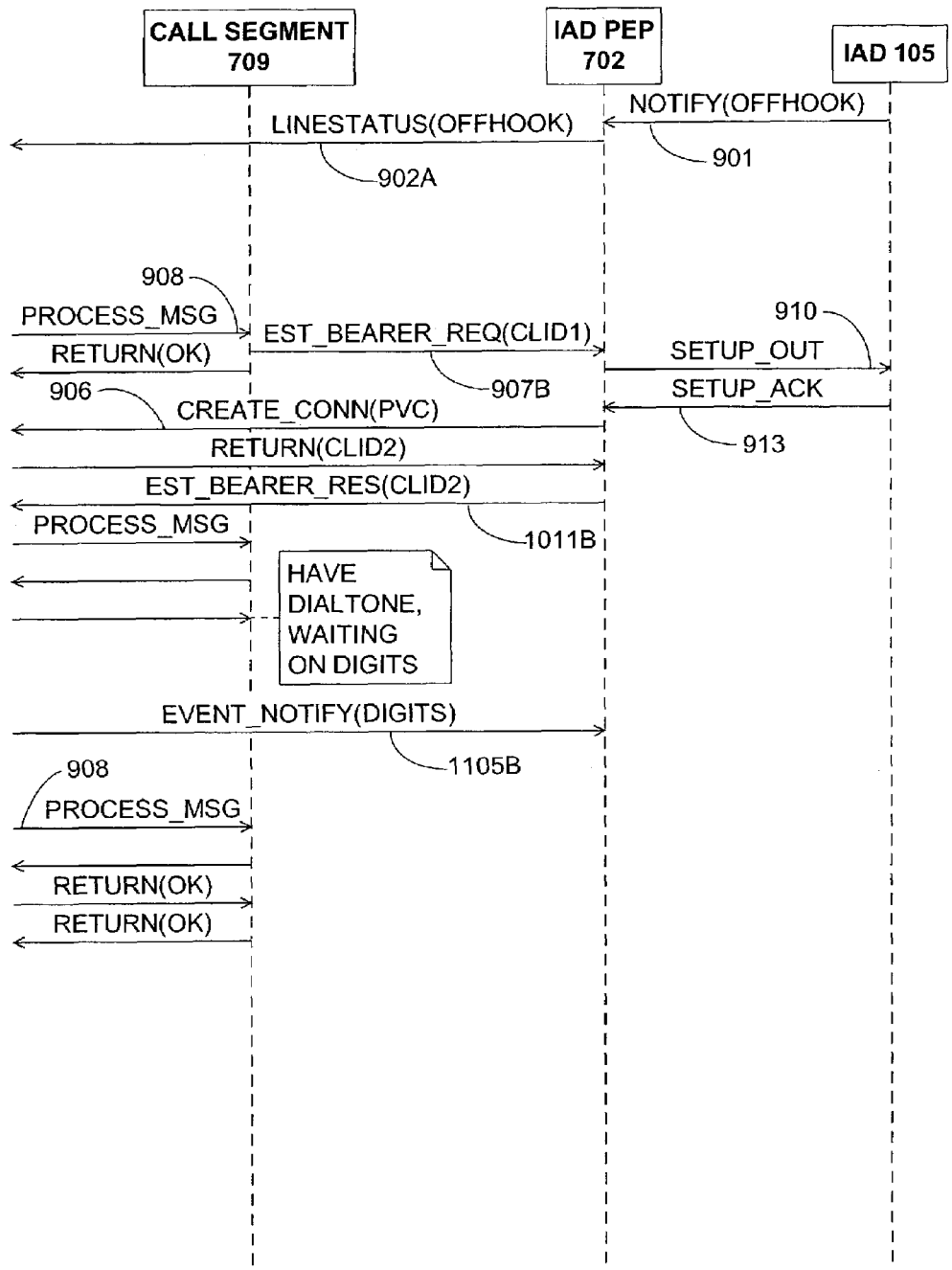
Figure 11C:
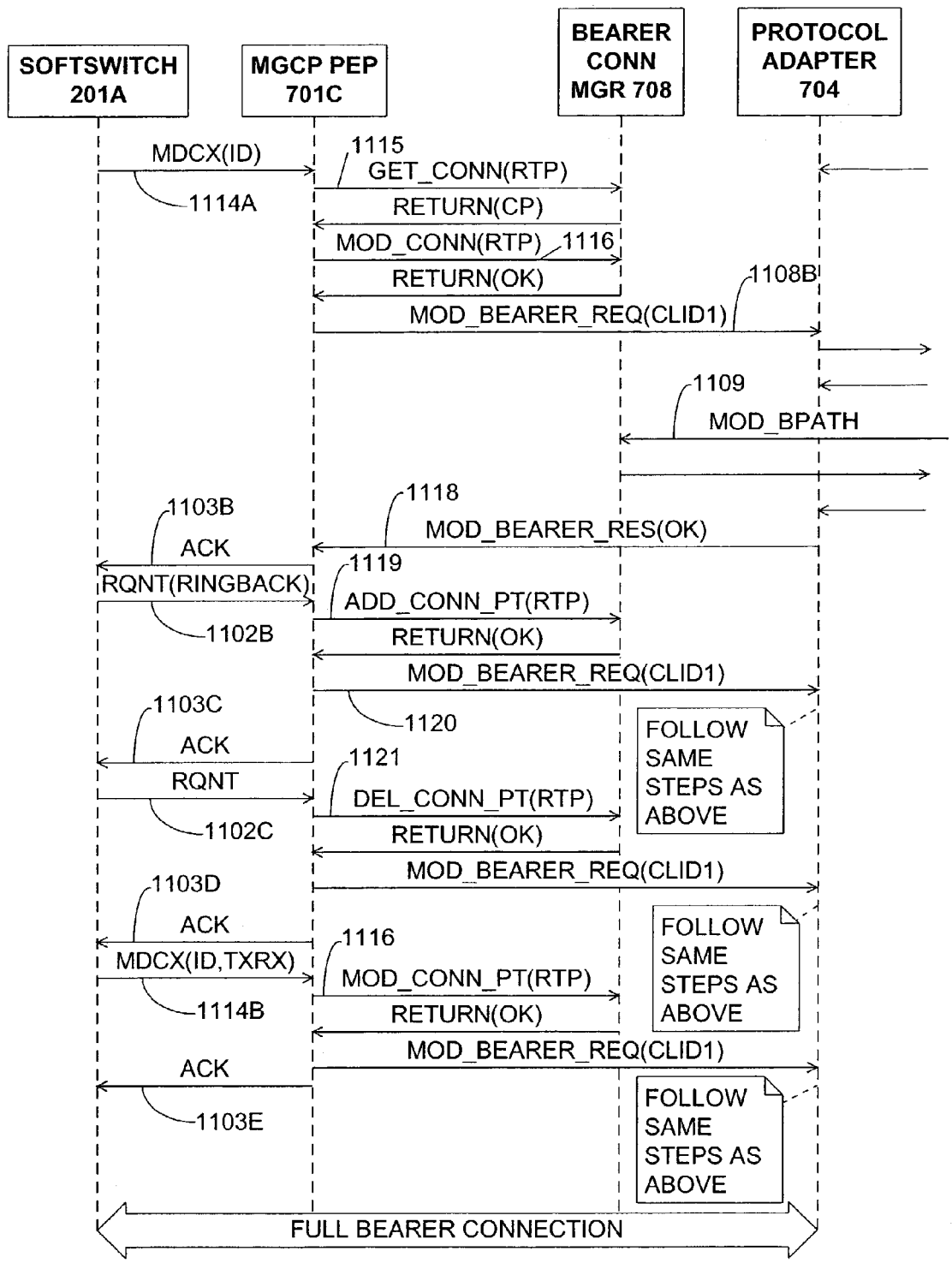
Figure 11D:
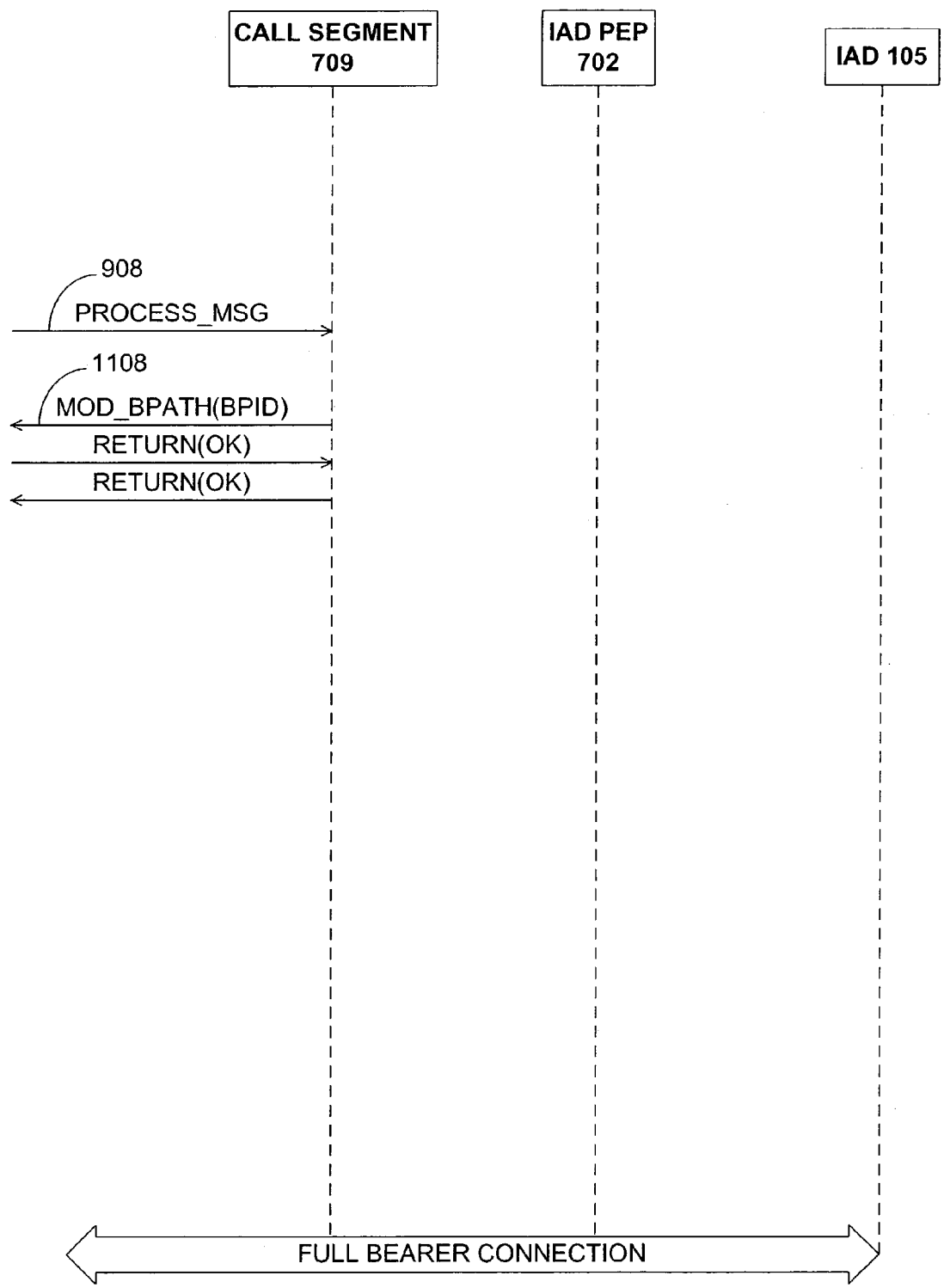

The processing continues in FIGS. 11C & 11D. Softswitch 201 sends a MGCP MdCx message 1114*a* which includes the IP address and port of the remote telephony device. MGCP Protocol Endpoint 701*c* uses the BearerConnectionMgr 708 services Get_Conn 1115 and Mod_Conn 1116 to associate this remote address/port with the connection identifier already obtained, so that the connection identifier now includes both sides of the connection. At this time, the MGCP connection is up, but is configured for receive only.

MGCP Protocol Endpoint 701 once again notifies Protocol Adapter 704 that the characteristics of the bearer path have changed, by sending a Mod_Bearer_Req message 1108*b*. Protocol Adapter 704 acts on the bearer request by calling the Process_Msg 908 function in Call Segment 709. Call Segment 709 acts on the Mod_Bearer_Req message 1108*b* by calling Mod_BPath 1109 in BearerConnectionMgr 708 to modify the bearer path as requested. When Call Segment 709 has completed, then Protocol Adapter 704 notifies MGCP Protocol Endpoint 701*c* that its bearer request has completed by sending a Mod_Bearer_Res message 1110*b*. MGCP Protocol Endpoint 701 then sends an MGCP Ack message 1103*b* to softswitch 201, responding to the MGCP MdCx message 1114 message.

The softswitch 201 requests the MGCP Protocol Endpoint 701*c* to play ringback tone while waiting on the remote side to go offhook, by sending a MGCP RqNt message 1102*b* and specifying the ringback signal. MGCP Protocol Endpoint 701*c* calls Add_Conn 1117 in BearerConnectionMgr 708 to add ringback tone to the connection identifier. Once again, Protocol Adapter 704 is notified that the characteristics of the bearer path have changed, Protocol Adapter 704 passes this through to Call Segment 709, and MGCP Protocol Endpoint 701*c* sends an MGCP Ack message 1103*c* to softswitch 201.

After some period of time, the softswitch 201 requests the MGCP Protocol Endpoint 701*c* to stop playing ringback tone, by sending a RqNt message 1102*c* and specifying no signal. After using the BearerConnectionMgr 708 service Del_Conn 1119 to remove ringback tone from the connection identifier, the MGCP Protocol Endpoint 701*c* notifies Protocol Adapter 704 of the change to the bearer path. As before, Protocol Adapter 704 passes this through to Call Segment 709, and MGCP Protocol Endpoint 701*c* sends an MGCP Ack message 1103*d* to softswitch 201.

When the remote side goes offhook, the softswitch 201 modifies the receive-only connection to be send and receive, by sending an MGCP MdCx message 1114*b* message. As before, MGCP Protocol Endpoint 701*c* uses BearerConnectionMgr 708 service Mod_Conn 1116 to modify the connection, this time to send/receive. And once again, MGCP Protocol Endpoint 701*c* notifies Protocol Adapter 704 of the change to the bearer path, Protocol Adapter 704 passes this through to Call Segment 709, and MGCP Protocol Endpoint 701*c* sends an MGCP Ack message 1103*e* message to softswitch 201. Finally, the call control is complete.

Figure 12A:
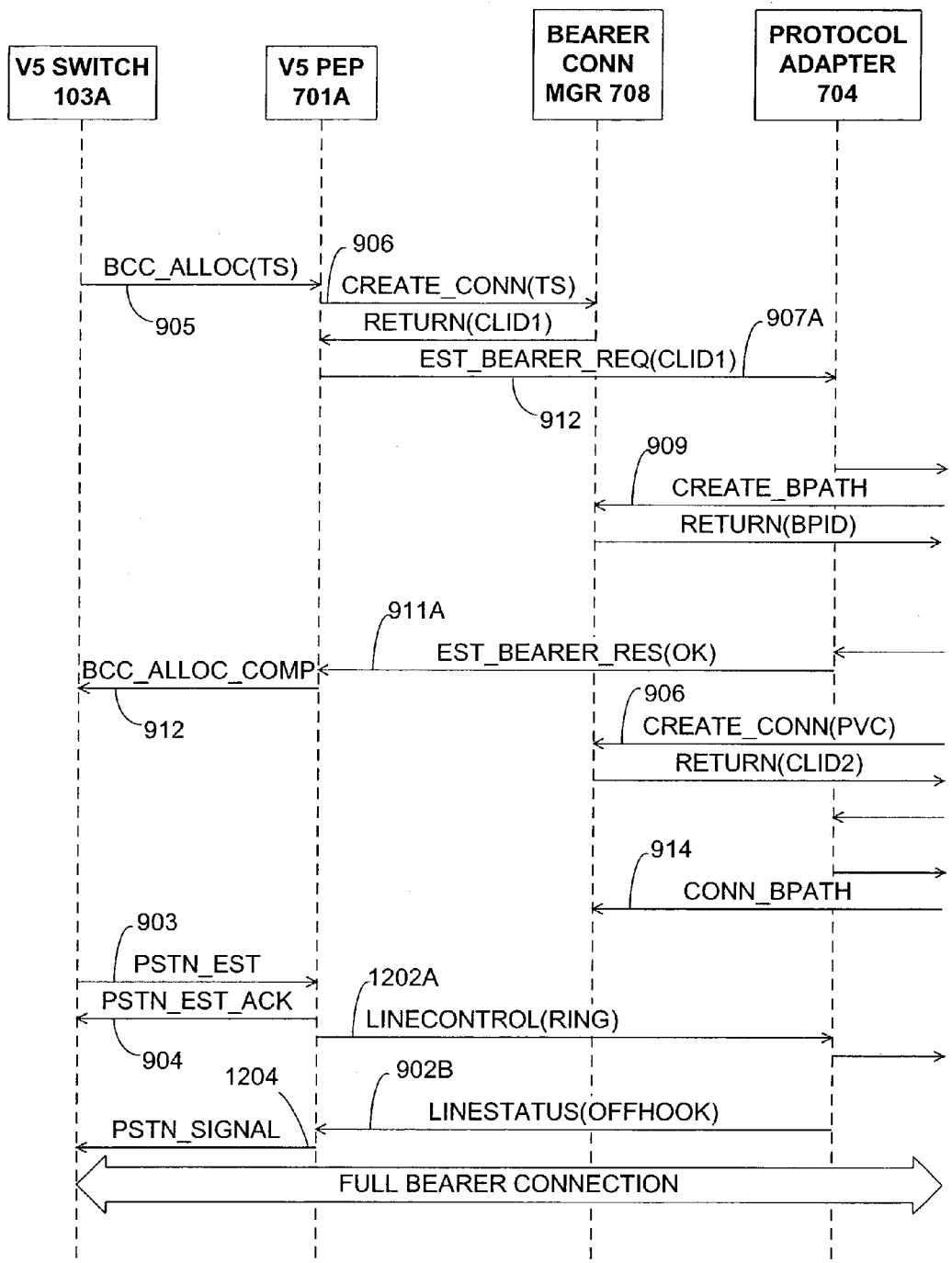
FIGS. 12A & 13B are a sequence diagram of object interactions for an outgoing call from a Class 5 switch using the V5 protocol. The diagram illustrates the interactions between objects in one embodiment of the call control module.

FIGS. 12A & B, viewed together, illustrate the interactions within call control module 603 during an incoming call from a switch 103*a* to the IAD 105 using V5 as the call control protocol. The incoming call begins in FIG. 12A when switch 103*a* sends a protocol-specific BCC_ALLOC message 905 which indicates which timeslot should be connected to the subscriber port that is managed by the peer protocol endpoint.

V5 Protocol Endpoint 701*a* acts on the BCC_ALLOC message 905 by requesting from BearerConnectionMgr 708 a connection identifier corresponding to the timeslot, using the function Create_Conn 906. V5 Protocol Endpoint 701*a* next begins the process of setting up its half of the bearer connection by sending Est_Bearer_Req message 907*a* to Protocol Adapter 704 (including the connection identifier), as Est_Bearer_Req message 907*b*. Protocol Adapter 704 acts on the bearer request by calling the Process_Msg 908 function in Call Segment 709. Call Segment 709 acts on the message by using the BearerConnectionMgr 708 function Create_BPath 909 to create a bearer path between V5 Protocol Endpoint 701*a* and IAD Protocol Endpoint 702.

Call Segment 709 continues processing of the Est_Bearer_Req message 907 by forwarding the message on to IAD Protocol Endpoint 702. IAD Protocol Endpoint 702 maps this message to the IAD-specific message SETUP_IN 1201, and sends SETUP_IN 1201 on to IAD 105. After forwarding the Est_Bearer_Req message 907*b*, Call Segment 709 returns to Protocol Adapter 704.

Protocol Adapter 704 notifies V5 Protocol Endpoint 701*a* that its bearer request has been completed by sending a Est_Bearer_Res message 911*a*. V5 Protocol Endpoint 701*a* then maps this internal message to the V5-specific message BCC_ALLOC_COMP 912, and sends BCC_ALLOC_COMP 912 to switch 103*a*, informing switch 103*a* that the timeslot has been allocated for the subscriber port managed by the peer protocol endpoint.

IAD Protocol Endpoint 702 receives a SETUP_ACK 913 from IAD 105 in response to the SETUP_IN 1201. IAD Protocol Endpoint 702 acts on this message by calling function Create_Conn 906 in BearerConnectionMgr 708 to request a connection identifier corresponding to the virtual circuit in used by the offhook subscriber. IAD Protocol Endpoint 702 next begins the process of setting up its half of the bearer connection by sending Est_Bearer_Res message 911*b* to Protocol Adapter 704, including the connection identifier. Protocol Adapter 704 acts on the bearer response by calling Process_Msg 908 in Call Segment 709. Call Segment 709 acts on Est_Bearer_Res message 911*b* by calling function Connect_BPath 914 in BearerConnectionMgr 708 to connect the bearer path between the two connection identifiers.

The bearer path is now connected between the switch 103*a* and the IAD 105, but the switch 103*a* hasn't notified the telephony device 102*a* about the call yet. After switch 103*a* receives the BCC_ALLOC_COMP 912 message indicating the timeslot allocation is complete, switch 103*a* sends V5 Protocol Endpoint 701*a* a protocol-specific PSTN_EST message 903. V5 Protocol Endpoint 701*a* responds by sending a PSTN_EST_ACK message 904 back to switch 103*a*. V5 Protocol Endpoint 701*a* also acts on the PSTN_EST message 903 by mapping it to the internal message LineControl Ring 1202*a*. V5 Protocol Endpoint 701*a* sends the message LineControl Ring 1202*a* to Protocol Adapter 704, which forwards the message to IAD Protocol Endpoint 702. IAD Protocol Endpoint 702 maps the internal message to the IAD-specific message Notify (Ring) 1203 and sends this to IAD 105.

When the ringing telephony device goes offhook, the IAD 105 reports this by sending a Notify (Offhook) message 901 to IAD Protocol Endpoint 702. IAD Protocol Endpoint 702 maps the Notify (Offhook) message 901, which is specific to the IAD protocol, to a LineStatus (Offhook) message 902*a*, which is one of the internal messages 703, and passes it on to the Protocol Adapter 704. Protocol Adapter 704 passes the message on, as LineStatus (Offhook) message 902*b*, on to peer V5 Protocol Endpoint 701*a*. V5 Protocol Endpoint 701*a* acts on the LineStatus (Offhook) message 902*b* by mapping it to a PSTN_SIGNAL 1204 message, which is specific to the V5 protocol.

At this point, call control is complete. The call control module 603 has connected the particular timeslot coming through the V5 TDM interface 602 from V5 Protocol Endpoint 701*a*, to the virtual circuit coming through the packet network interface 601 from IAD 105, and the remote telephony device has gone offhook to pick up the call.

Figure 13A:
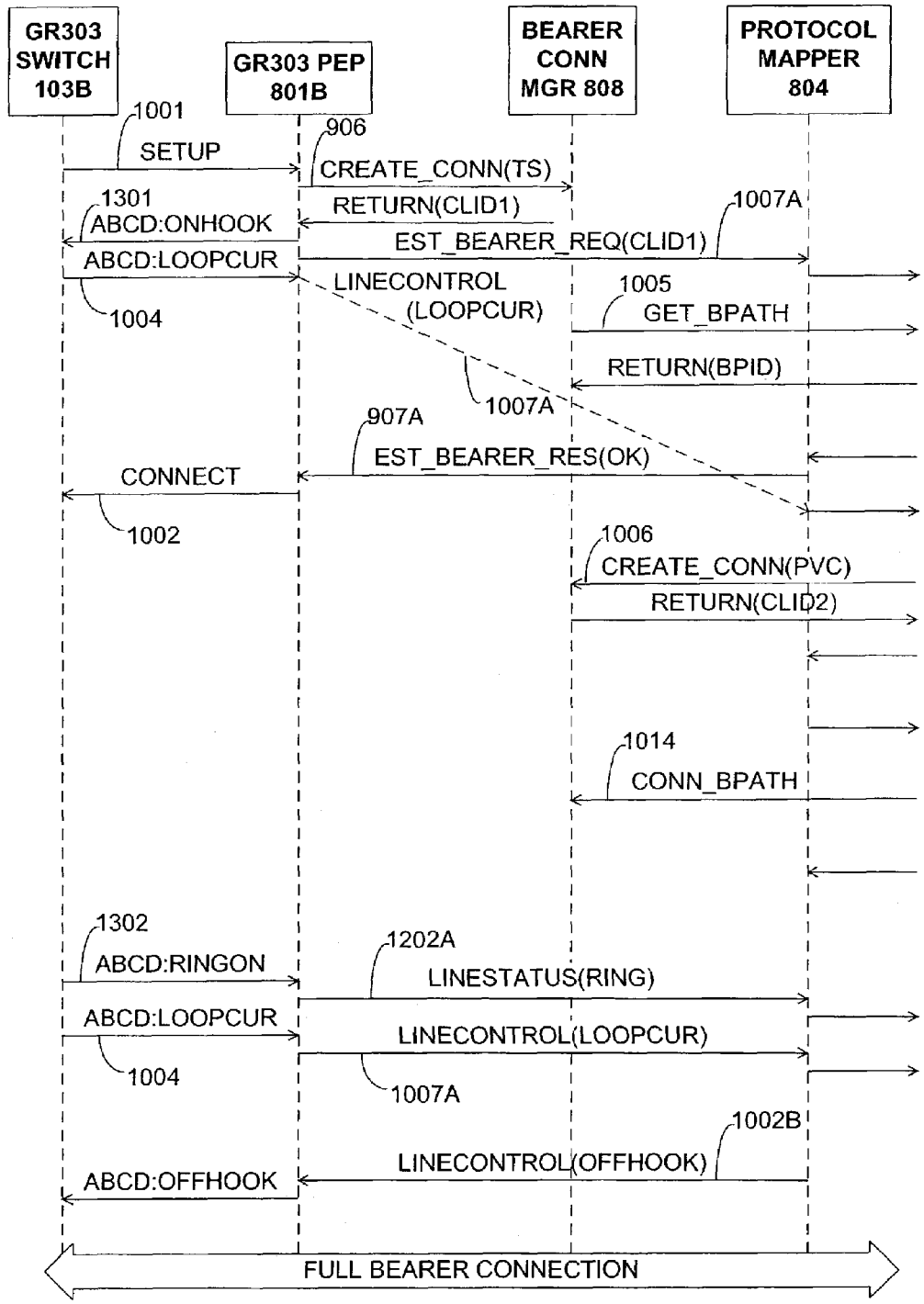

FIGS. 13A & B, viewed together, illustrate the interactions within call control module 603 during an incoming call from a switch 103*b* to the IAD 105 using GR-303 as the call control protocol. The incoming call begins when GR-303 switch 103*b* sends GR303 Protocol Endpoint 701*b* a protocol-specific SETUP message 1001 which indicates which timeslot should be connected to the subscriber port that is managed by the peer protocol endpoint.

GR303 Protocol Endpoint 701*b* acts on the SETUP message 1001 by calling Create_Conn 906 in BearerConnectionMgr 708 to request a connection identifier corresponding to the timeslot. GR303 Protocol Endpoint 701*b* next begins the process of setting up its half of the bearer connection by sending Est_Bearer_Req message 907*a* to Protocol Adapter 704, including the connection identifier. GR303 Protocol Endpoint 701*b* also sends the protocol-specific ABCD:OnHook message 1301 to switch 103*b*. Switch 103*b* responds by sending ABCD:LoopCur message 1004 to GR303 Protocol Endpoint 701*b*. GR303 Protocol Endpoint 701*b* doesn't act on this message yet, but waits until its bearer request to Protocol Adapter 704 is complete.

Protocol Adapter 704 acts on the bearer request from GR303 Protocol Endpoint 701*b* by calling the Process_Msg 908 function in Call Segment 709. Call Segment 709 acts on Est_Bearer_Req message 907*a* by using the BearerConnectionMgr 708 function Get_BPath 1005 to get the bearer path identifier representing the path between GR303 Protocol Endpoint 701*b* and IAD Protocol Endpoint 702.

Call Segment 709 continues processing of the Est_Bearer_Req message 907*a* by forwarding the message on to IAD Protocol Endpoint 702, as Est_Bearer_Req message 907*b*. IAD Protocol Endpoint 702 maps this message from the common set of internal messages 703 to the IAD-specific message SETUP_IN 1201, and sends this message on to IAD 105. Call Segment 709 then returns to Protocol Adapter 704.

Protocol Adapter 704 notifies GR303 Protocol Endpoint 701*b* that its bearer request has been completed by sending a Est_Bearer_Res message 911*a*. GR303 Protocol Endpoint 701*b* maps this internal message to the GR-303-specific message CONNECT message 1002, and sends CONNECT message 1002 to switch 103*b*, informing switch 103*b* that the timeslot has been allocated for the offhook subscriber's port.

GR303 Protocol Endpoint 701*b* also acts on the cached ABCD:LoopCur message 1004 by mapping it to the internal message LineControl(LoopCurr) 1007*a* and sending this message to the Protocol Adapter 704. Protocol Adapter 704 forwards the LineControl(LoopCurr) 1007*a* on to peer IAD Protocol Endpoint 702, as LineControl(LoopCurr) 1007*b*.

When IAD Protocol Endpoint 702 receives a SETUP_ACK 913 from IAD 105, IAD Protocol Endpoint 702 acts on this message by calling Create_Conn 906 in BearerConnectionMgr 708 to request the connection identifier corresponding to the virtual circuit used by the offhook subscriber. IAD Protocol Endpoint 702 next begins the process of setting up its half of the bearer connection by sending Est_Bearer_Res message 911*b* to Protocol Adapter 704, including the connection identifier.

Protocol Adapter 704 acts on the bearer request from IAD Protocol Endpoint 702 by calling the Process_Msg 908 function in Call Segment 709. Call Segment 709 acts on the message by using the BearerConnectionMgr 708 function Connect_BPath 914 to connect the bearer path between the two connection identifiers.

The bearer path is now connected between the switch 103*b* and the IAD 105, but the switch 103*b* hasn't notified the remote telephony device about the call yet. At some point after switch 103*b* receives the CONNECT message 1002 indicating the timeslot allocation is complete, Switch 103*b* sends GR303 Protocol Endpoint 701*b* a protocol-specific ABCD:RingOn message 1302. GR303 Protocol Endpoint 701*b* acts on the protocol-specific message by mapping it to the internal message LineControl Ring 1202. GR303 Protocol Endpoint 701*b* sends this LineControl Ring 1202*a* message to Protocol Adapter 704, which forwards the message, as LineControl Ring 1202*b*, to IAD Protocol Endpoint 702. IAD Protocol Endpoint 702 maps the internal message to the IAD-specific message Notify (Ring) 1203 and sends this to IAD 105.

Switch 103*b* also sends GR303 Protocol Endpoint 701*b* a protocol-specific ABCD:LoopCur message 1004. This message is treated in similar manner: translated to a common LineControl(LoopCurr) 1007 and forwarded all the way through to IAD Protocol Endpoint 702. IAD Protocol Endpoint 702 maps the internal message to the IAD-specific message Notify (LoopCurrent) 1303 and sends this to IAD 105.

When the ringing remote telephony device goes offhook, the IAD 105 reports this by sending a Notify (Offhook) message 901 to IAD Protocol Endpoint 702. IAD Protocol Endpoint 702 maps the Notify (Offhook) message 901, which is specific to the IAD protocol, to LineStatus (Offhook) message 902*a*, which is one of the internal messages, and passes it on to the Protocol Adapter 704 as LineStatus (Offhook) message 902*b*. Protocol Adapter 704 passes the LineStatus (Offhook) message 902*b* on to peer GR303 Protocol Endpoint 701*b*. GRGR303 Protocol Endpoint 701*b* acts on the LineStatus (Offhook) message 902*b* by mapping it to ABCD: Offhook message 1003, which is specific to the GR-303 protocol.

At this point, call control is complete. The call control module 603 has connected the particular timeslot coming through the GR-303 TDM interface 602 from switch 103*b* to the virtual circuit coming through the packet network interface 601 from IAD 105, and the remote telephony device has gone offhook to pick up the call.

Figure 14:
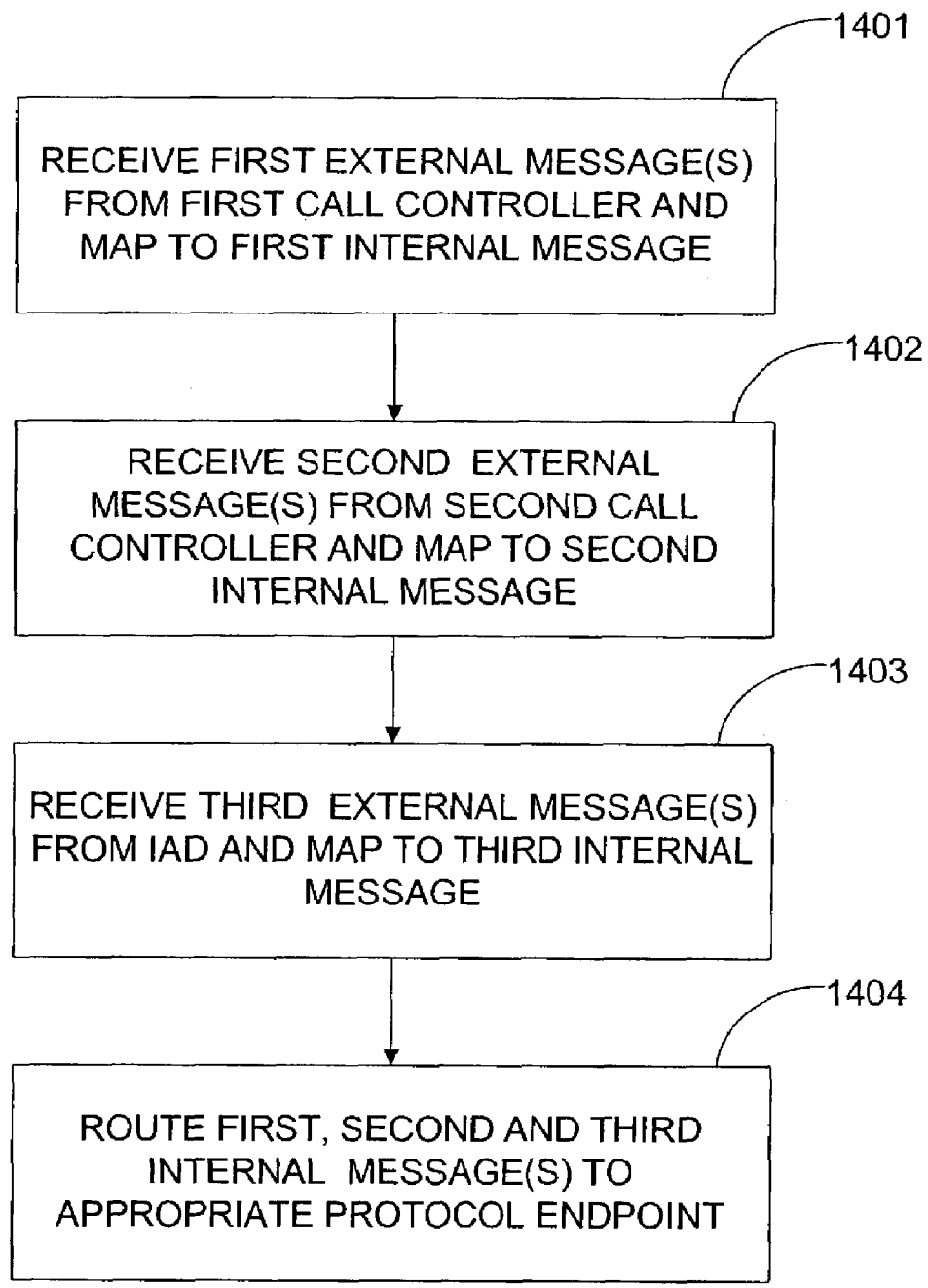
FIG. 14 illustrates a method for supporting multiple call control protocols simultaneously in a gateway that connects a local packet network (LPN) and a circuit-switched network.
Figure 6A:
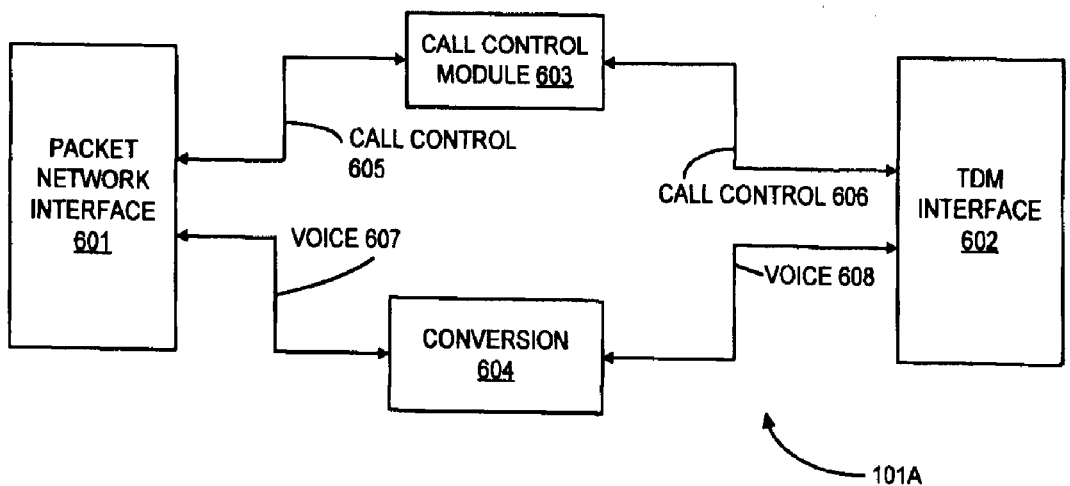
Figure 6B:
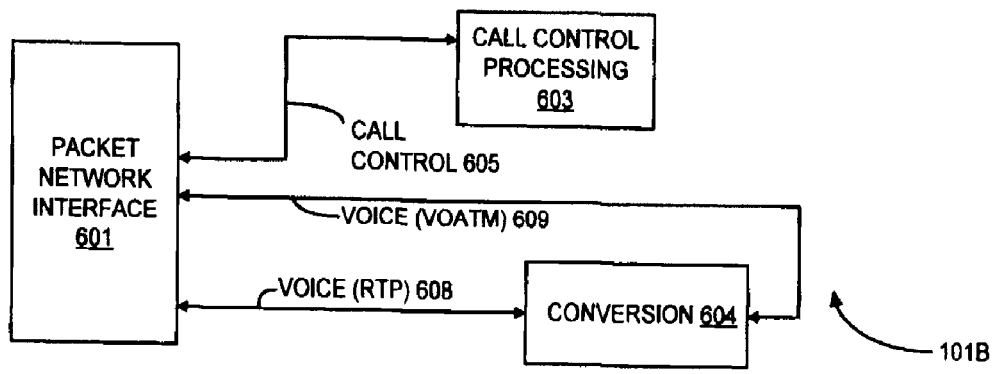

FIG. 14 illustrates a method for supporting multiple call control protocols simultaneously in a gateway that connects a local packet network (LPN) and a circuit-switched network. In this example, there are two call controllers and two IAD ports, for a total of four sources of external messages. Each external message source has a corresponding protocol endpoint, so there are also four protocol endpoints. Messages are routed between protocol endpoints appropriately, based on the mapping between endpoints during provisioning. The process begins at step 1401, where one or more external messages is received from a call controller and mapped to one or more corresponding internal call control messages. At step 1402, another external message (or messages) from another call controller is received and mapped to one or more corresponding internal call control messages. At step 1403, one or more external messages is received from an IAD 105 and mapped to one or more corresponding internal call control messages. At step 1404, each of the internal messages is routed to an appropriate protocol endpoint. The appropriate choice depends on how the protocol endpoints were mapped together during provisioning.

The foregoing description has been presented for purposes of illustration and description. It is not intended to be exhaustive or to limit the invention to the precise forms disclosed. Obvious modifications or variations are possible in light of the above teachings. The embodiments discussed, however, were chosen and described to illustrate the principles of the invention and its practical application to thereby enable one of ordinary skill in the art to utilize the invention in various embodiments and with various modifications as are suited to the particular use contemplated. All such modifications and variation are within the scope of the invention as determined by the appended claims when interpreted in accordance with the breadth to which they are fairly and legally entitled.

Therefore, having thus described the invention, at least the following is claimed:

1. An apparatus connecting a local packet network (LPN) and a circuit-switched network, the apparatus comprising:
   a first protocol endpoint configured to receive at least one first external call control message of a first protocol from a first call controller associated with the circuit-switched network and to map the at least one first external call control message to at least one corresponding first internal call control message of an internal protocol;
   a second protocol endpoint configured to receive at least one second external call control message of a second protocol from an integrated access device (IAD) associated with the LPN and to map the at least one second external call control message to at least one corresponding second internal call control message of an internal protocol; and a protocol adapter configured to receive the first and the second internal call control messages and to route the at least one first internal call control message to the second protocol endpoint and the at least one second internal call control message to the first protocol endpoint;

wherein the first protocol endpoint is further configured to receive the at least one second internal call control message and to map the at least one second internal call control message to a third external call control message of the first protocol, and wherein the second protocol endpoint is further configured to receive the at least one first internal call control message and to map the at least one first internal call control message to a fourth external call control message of the second protocol.

2. The apparatus of claim 1, further comprising a third protocol endpoint configured to receive at least one fifth external call control message of a third protocol from a second call controller and to map the fifth external call control message to at least one corresponding third internal control message of the internal protocol, wherein the protocol adapter is further configured to receive the third internal call control message and to route the third internal call control message to an appropriate one of the first and second protocol endpoints.

3. The apparatus of claim 1, wherein the first protocol endpoint is further configured to receive at least one third internal call control message of the internal protocol from the protocol adapter and to map the at least one third internal call control message to at least one corresponding fifth external call control message of the first protocol for transmission to the first call controller.

4. The apparatus of claim 1, further comprising a bearer connection manager configured to manage each of a plurality of bearer connections, wherein each of the plurality of bearer connections comprises at least two connection points.

5. The apparatus of claim 4, wherein the bearer connection manager is capable of at least one of creating the bearer connection, destroying the bearer connection, connecting the at least two connection points in the bearer connection, adding a connection point to the bearer connection, deleting the connection point from the bearer connection, and modifying the characteristics of the bearer connection.

6. The apparatus of claim 4, further comprising a call segment configured to connect and to disconnect the at least two connection points in the bearer connection.

7. The apparatus of claim 6, wherein the call segment is further configured to process a set of bearer-related messages.

8. The apparatus of claim 1, further comprising:
a first interface, configured to receive a first plurality of voice packets from the LPN and to transmit a second plurality of voice packets to the LPN;
a second interface, configured to receive a first plurality of voice timeslots from the circuit-switched network and to transmit a second plurality of voice timeslots to the circuit-switched network;
a first converter, configured to receive the first plurality of voice packets from the first interface and to convert the first plurality of voice packets to the second plurality of voice timeslots; and
a second converter, configured to receive the first plurality of voice timeslots from the second interface and to convert the first plurality of voice timeslots to the second plurality of voice packets.

9. The apparatus of claim 1, wherein the first external call control message is a General Requirements 303 (GR-303) message.

10. The apparatus of claim 1, wherein the first external call control message is a European Telecommunications Standards Institute (ETSI) V5 message.

11. The apparatus of claim 1, wherein the first external call control message is a Media Gateway Control Protocol (MGCP) message.

12. The apparatus of claim 1, wherein the first external call control message is a Session Initiation Protocol (SIP) message.

13. The apparatus of claim 1, wherein the first external call control message is a H.248 message.

14. An apparatus connecting a local packet network (LPN) and a circuit-switched network and capable of supporting multiple call control protocols simultaneously, the apparatus comprising:
a first call control protocol endpoint configured to exchange a first plurality of external call control messages of a first protocol associated with the first call control protocol endpoint with a first call controller associated with the circuit-switched network, and further configured to map external call control messages of the first protocol to corresponding internal call control messages of an internal protocol;
a second call control protocol endpoint configured to exchange a second plurality of external call control messages of a second protocol associated with the second call control protocol endpoint with a second call controller, and further configured to map external call control messages of the second protocol to corresponding internal call control messages of the internal protocol;
a third call control protocol endpoint configured to exchange a third plurality of external call control messages of a third protocol associated with the third call control protocol endpoint with an integrated access device (IAD) associated with the LPN, and further configured to map external call control messages of the third protocol to corresponding internal call control messages of the internal protocol; and
a protocol adapter configured to receive internal call control messages from the first, second and third call control protocol endpoints, and further configured to route each of the internal call control messages received from one of the call control protocol endpoints to another of the call control protocol endpoints, wherein the another call control protocol endpoint is configured to map the routed internal call control message to a corresponding external call control message of the protocol associated with the another call control protocol endpoint.

15. The apparatus of claim 14, wherein the first external call control message is a General Requirements 303 (GR-303) message.

16. The apparatus of claim 14, wherein the first external call control message is a European Telecommunications Standards Institute (ETSI) V5 message.

17. The apparatus of claim 14, wherein the first external call control message is a Media Gateway Control Protocol (MGCP) message.

18. A method for supporting multiple call control protocols simultaneously in a gateway that connects a local packet network (LPN) and a circuit-switched network, the method comprising:
receiving at least one first external call control message from a first call controller associated with the circuit-switched network, the at least one first external call control message of a protocol associated with the first call controller;

mapping the at least one first external call control message to at least one corresponding first internal call control message of an internal protocol;

receiving at least one second external call control message from a second call controller, the at least one second external call control message of a protocol associated with the second call controller;

mapping the at least one second external call control message to at least one corresponding second internal call control message of the internal protocol;

receiving at least one third external call control message from an integrated access device (IAD) associated with the LPN, the at least one third external call control message of a protocol associated with the IAD;

mapping the at least one third external call control message to at least one corresponding third internal call control message of the internal protocol;

routing the at least one first internal call control message for mapping to a corresponding fourth external call control message of the protocol associated with either the second call controller or the IAD;

routing the at least one second internal call control message for mapping to a corresponding fifth external call control message of the protocol associated with either the first call controller or the IAD; and routing the at least one third internal call control message for mapping to a corresponding sixth external call control message of the protocol associated with either the first or second call controllers.

19. The method of claim 18, further comprising managing each of a plurality of bearer connections wherein each of the plurality of bearer connections comprises at least two connection points.

20. The method of claim 18, further comprising:
receiving a first plurality of voice packets from the LPN;
transmitting a second plurality of voice packets to the LPN;
receiving a first plurality of voice timeslots from the circuit-switched network;
transmitting a second plurality of voice timeslots to the circuit-switched network;
converting the first plurality of voice packets to the first plurality of voice timeslots; and
converting the second plurality of voice timeslots to the second plurality of voice packets.

21. The method of claim 18, wherein the first external call control message is a Generic Requirements 303 (GR-303) message.

22. The method of claim 18, wherein the first external call control message is a European Telecommunications Standards Institute (ETSI) V5 message.

23. The method of claim 18, wherein the first external call control message is a Media Gateway Control Protocol (MGCP) message.

24. The method of claim 18, wherein the first external call control message is a Session Initiation Protocol (SIP) message.

25. A system for supporting multiple call control protocols simultaneously in a gateway that connects a local packet network (LPN) and a circuit-switched network, the system comprising:
means for exchanging a first plurality of call control messages with a first call controller associated with the circuit-switched network, the first plurality of call control messages of a protocol associated with the first call controller;

means for mapping each of the first plurality of call control messages received from the first call controller to a corresponding internal call control message of an internal protocol;

means for mapping each of the first plurality of call control messages sent to the first call controller from a corresponding routed internal call control message of the internal protocol;

means for exchanging a second plurality of call control messages with a second call controller, the second plurality of call control messages of a protocol associated with the second call controller;

means for mapping each of the second plurality of call control messages received from the second call controller to a corresponding internal call control message of the internal protocol;

means for mapping each of the second plurality of call control messages sent to the second call controller from a corresponding routed internal call control message of the internal protocol;

means for exchanging a third plurality of call control messages of a third protocol with an integrated access device (IAD) associated with the LPN, the third plurality of call control messages of a protocol associated with the IAD;

means for mapping each of the third plurality of call control messages received from the IAD to a corresponding internal call control message of the internal protocol;

means for mapping each of the third plurality of call control messages sent to the IAD from a corresponding routed internal call control message of the internal protocol; and means for routing each of the internal call control messages from one of the means for mapping from received call control messages to a predetermined one of the means for mapping to sent call control messages.

26. A computer readable storage medium containing program code for controlling a method for supporting multiple call control protocols simultaneously in a voice-over-packet (VoP) media gateway that connects a local packet network (LPN) and a circuit-switched network, the program code comprising logic configured to perform the steps of:
receiving at least one first external call control message of a first protocol from a first call controller associated with the circuit-switched network;

mapping the at least one first external call control message to at least one corresponding first internal call control message of an internal protocol;

receiving at least one second external call control message of a second protocol from a second call controller;

mapping the at least one second message to at least one corresponding second internal call control message of the internal protocol;

receiving at least one third external call control message of a third protocol from an integrated access device (IAD) associated with the LPN;

mapping the at least one third external call control message to at least one corresponding third internal call control message of the internal protocol;

routing the at least one first internal call control message for mapping to at least one corresponding fourth external call control message of the second or third protocol;

routing the at least one second internal call control message for mapping to at least one corresponding fifth external call control message of the first or third protocol; and routing the at least one third internal call control message for mapping to at least one corresponding sixth external call control message of the first or second protocol.

27. An apparatus connecting a local packet network (LPN) and a circuit-switched network, the apparatus comprising:

a plurality of protocol endpoints, each protocol endpoint configured to receive external call control messages of an external protocol associated with the protocol endpoint and to map the external call control messages to corresponding internal call control messages of an internal protocol for routing to another of the plurality of protocol endpoints, each endpoint further configured to receive routed internal call control messages of the internal protocol and to map the routed internal call control messages to corresponding external call control messages of the external protocol associated with the protocol endpoint, wherein at least one of the plurality of protocol endpoints is configured to receive the external call control messages from a first call controller associated with the circuit-switched network and at least a second of the plurality of protocol endpoints is configured to receive the external call control messages from an integrated access device (IAD) associated with the LPN; and a protocol adapter configured to route the internal call control messages from the mapping protocol endpoint to the another protocol endpoint.

\* \* \* \* \*

UNITED STATES PATENT AND TRADEMARK OFFICE
CERTIFICATE OF CORRECTION

| | | |
|---|---|---|
| PATENT NO. | : 7,460,520 B2 | Page 1 of 13 |
| APPLICATION NO. | : 10/463964 | |
| DATED | : December 2, 2008 | |
| INVENTOR(S) | : Cody et al. | |

It is certified that error appears in the above-identified patent and that said Letters Patent is hereby corrected as shown below:

In the drawings
Replace Figures 6B, 7, 10A, 11A, 11B, 11D, 12A, 12B, 13A, and 13B with replacement Figures 6B, 7, 10A, 11A, 11B, 11D, 12A, 12B, 13A, and 13B attached to this certificate, as shown In column 2, line 49: delete "supports both both packet" and replace with --supports both packet--

Figure 12B:
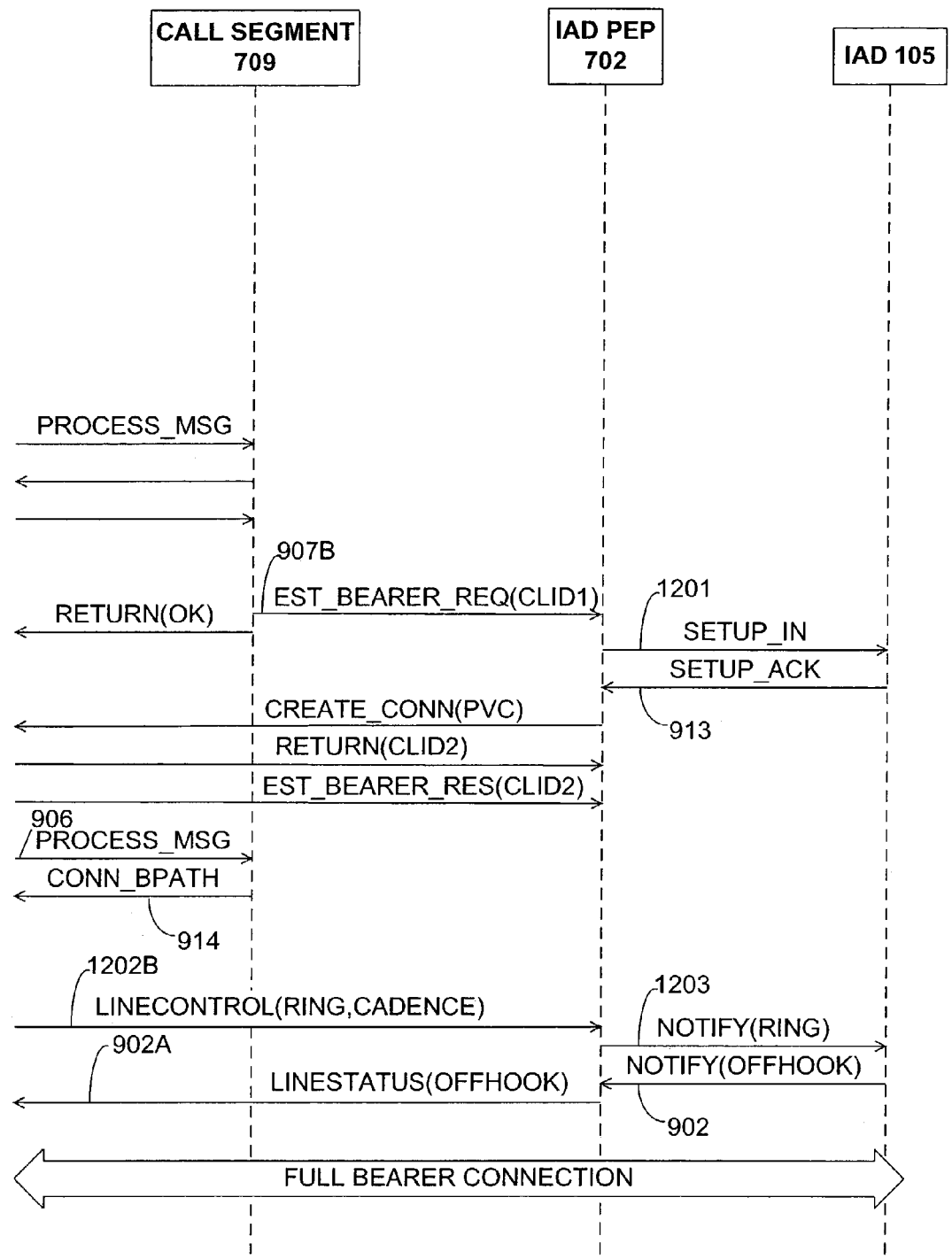
Figure 13B:
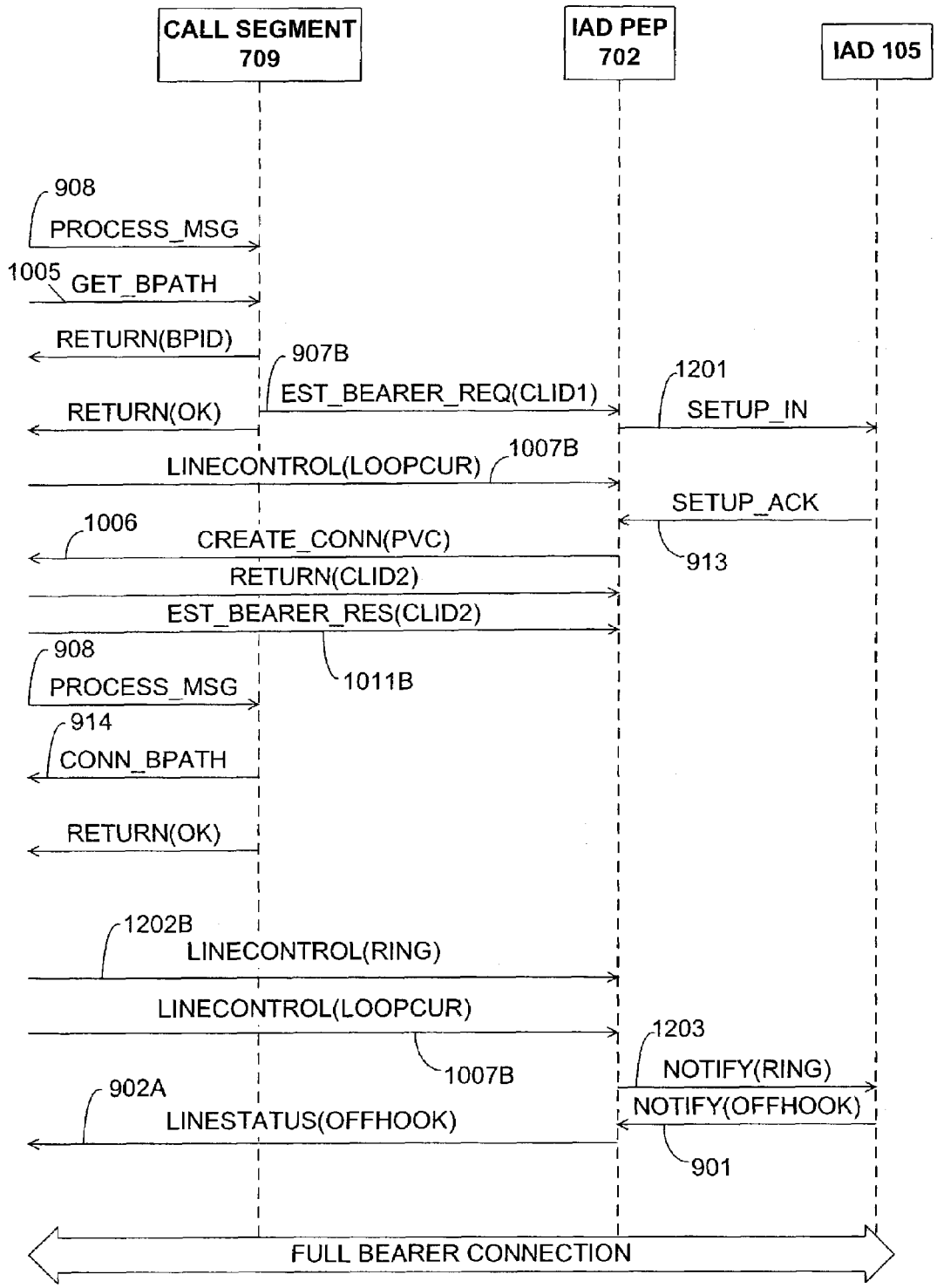

In column 3, line 8: delete "FIGS. 12A & 13B are" and replace with --FIGS. 12A & 12B are--

In column 5, line 13: delete "voice gateway 105" and replace with --voice gateway 101--

In column 7, line 40: delete "referred to as IP over ATM" In that" and replace with
--referred to as "IP over ATM". In that--

In column 8, line 48: delete "Voice gateway 101" and replace with --Voice gateway 101b--

In column 10, line 7: delete "as shown by links 701a and 702a." and replace with
--as shown by links 701e and 702e.--

In column 10, line 10: delete "link Call Segment 709a" and replace with --link 709a--

In column 10, line 27: delete "Endpoints: 801a-d and 802a-d." and replace with
--Endpoints: 701a-d and 702a-d.--

In column 11, line 2: delete "endpoints use a internal message" and replace with
--endpoints use an internal message--

In column 12, line 24: delete "LineStatus (Offhook) message 902," and replace with
--LineStatus (Offhook) message 902a,--

Signed and Sealed this
Thirtieth Day of August, 2011

David J. Kappos
*Director of the United States Patent and Trademark Office*

CERTIFICATE OF CORRECTION (continued)
U.S. Pat. No. 7,460,520 B2

In column 12, line 61: delete "TAD-specific message SETUP_OUT 915" and replace with --IAD-specific message SETUP_OUT 910--

In column 13, line 5: delete "Protocol Adapter 704" and replace with --Protocol Endpoint 701b--

In column 13, lines 7 and 8: delete "LineControl(LoopCurr) 1007a" and replace with --LineControl(LoopCur) 1007a--

In column 13, lines 10 and 12: delete "(LoopCurr) 1007b" and replace with --(LoopCur) 1007b--

In column 13, line 42: delete "begins in FIG. 11A" and replace with --begins in FIG. 11B--

In column 13, line 48: delete "902, which is one of" and replace with --902a, which is one of--

In column 14, line 8: delete "Event message 1203" and replace with --Event message 1104--

In column 14, line 9: delete "Event_Notify 1105a and 1205b" and replace with --Event_Notify 1105a and 1105b--

In column 14, lines 16 and 44: delete "Protocol Endpoint 701" and replace with --Protocol Endpoint 701c--

In column 14, line 64: delete "Mod_Bearer_Res message 1110b" and replace with --Mod_Bearer_Res message 1118--

In column 14, lines 66-67: delete "MdCx message 1114 message." and replace with --MdCx message 1114a.--

In column 15, line 5: delete "Add_Conn 1117" and replace with --Add_Conn_PT 1119--

In column 15, line 8: delete "have changed Protocol Adapter" and replace with --have changed (1120), Protocol Adapter--

In column 15, lines 14-15: delete "service Del_Conn 1119 to remove" and replace with --service Del_Conn_PT 1121 to remove--

In column 15, line 25: delete "service Mod_Conn 1116 to modify" and replace with --service Mod_Conn_PT 1116 to modify--

In column 15, lines 45-46: delete "connection identifier), as Est_Bearer_Req message 907b." and replace with --connection identifier).--

In column 16, line 6: delete "circuit in used by" and replace with --circuit used by--

In column 16, line 27: delete "the message to IAD" and replace with --the message 1202b to IAD--

CERTIFICATE OF CORRECTION (continued)
U.S. Pat. No. 7,460,520 B2

In column 17, line 53: delete "LineControl Ring 1202" and replace with --LineControl(Ring) 1202a--

In column 17, line 63: delete "LineControl(LoopCurr) 1007" and replace with --LineControl(LoopCur) 1007a--

In column 17, line 64: delete "Endpoint 702." and replace with --Endpoint 702 as LineControl(LoopCur) 1007b.--

In column 17, line 66: delete "Notify (LoopCurrent) 1303 and" and replace with --Notify(Ring) 1203 and--

In column 18, lines 7-8: delete "Adapter 704 as LineStatus (Offhook) message 902b. Protocol" and replace with --Adapter 704. Protocol--